(12) United States Patent
Vogelsang et al.

(10) Patent No.: US 9,521,338 B2
(45) Date of Patent: *Dec. 13, 2016

(54) IMAGE SENSOR SAMPLED AT NON-UNIFORM INTERVALS

(71) Applicant: Rambus Inc., Sunnyvale, CA (US)

(72) Inventors: Thomas Vogelsang, Mountain View, CA (US); David Geoffrey Stork, Portola Valley, CA (US); Jie Shen, Fremont, CA (US); Yeuyong Wang, Sunnyvale, CA (US); Marko Aleksic, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/355,814

(22) PCT Filed: Nov. 8, 2012

(86) PCT No.: PCT/US2012/064190
§ 371 (c)(1),
(2) Date: May 1, 2014

(87) PCT Pub. No.: WO2013/070942
PCT Pub. Date: May 16, 2013

(65) Prior Publication Data
US 2014/0313387 A1    Oct. 23, 2014

Related U.S. Application Data

(60) Provisional application No. 61/557,364, filed on Nov. 8, 2011, provisional application No. 61/557,368, filed
(Continued)

(51) Int. Cl.
*H04N 5/353*     (2011.01)
*H04N 5/335*     (2011.01)
(Continued)

(52) U.S. Cl.
CPC ............ *H04N 5/353* (2013.01); *H04N 5/3355* (2013.01); *H04N 5/3696* (2013.01); *H04N 5/37455* (2013.01); *H04N 5/37457* (2013.01)

(58) Field of Classification Search
CPC ............ H04N 5/355–5/3559; H04N 5/37455; H04N 5/37457; H04N 5/155; H04N 3/155; H04N 3/1556
See application file for complete search history.

(56) References Cited

U.S. PATENT DOCUMENTS 6,152,368 A     11/2000   Olmstead et al.
6,963,370 B2 *  11/2005   DiCarlo ............. H04N 5/35545
                                                    348/297

(Continued)

FOREIGN PATENT DOCUMENTS

WO    WO-2008-027212 A1    3/2008
WO    WO-2008-062404 A2    5/2008
WO    WO-2010-084493 A1    7/2010

OTHER PUBLICATIONS

Campos, Fernando De Souza, "Active Pixel Sensor CMOS Operating Multi—Sampled in Time Domain, Photodiodes—World Activities in 2011," 2011, Chapter from in Tech, pp. 121-138, published in 2011. 18 pages.
(Continued)

*Primary Examiner* — Paul Berardesca
(74) *Attorney, Agent, or Firm* — Charles Shemwell

(57) ABSTRACT

In an integrated-circuit image sensor, binary sample values are read out from an array of pixels after successive sampling intervals that collectively span an image exposure interval and include at least two sampling intervals of unequal duration. Each pixel of the array is conditionally
(Continued)

reset after each of the successive sampling intervals according to whether the pixel yields a binary sample in a first state or a second state.

20 Claims, 24 Drawing Sheets

Related U.S. Application Data on Nov. 8, 2011, provisional application No. 61/580,189, filed on Dec. 23, 2011, provisional application No. 61/643,172, filed on May 4, 2012, provisional application No. 61/684,117, filed on Aug. 16, 2012.

(51) Int. Cl.
*H04N 5/3745* (2011.01)
*H04N 5/369* (2011.01)

(56) References Cited

U.S. PATENT DOCUMENTS

| | | | |
|---|---|---|---|
| 6,975,355 | B1 | 12/2005 | Yang et al. |
| 7,492,400 | B2 | 2/2009 | El Gamal et al. |
| 7,876,362 | B2 | 1/2011 | Krymski |
| 8,022,350 | B2 | 9/2011 | Ackland |
| 8,022,450 | B2 | 9/2011 | Lim |
| 8,446,503 | B1* | 5/2013 | Koenck ............ H04N 5/33 348/297 |
| 2007/0012868 | A1 | 1/2007 | Stoppa et al. |
| 2008/0043119 | A1* | 2/2008 | Mabuchi ............ H04N 5/235 348/231.99 |
| 2008/0074523 | A1 | 3/2008 | Panicacci |
| 2008/0074524 | A1 | 3/2008 | Panicacci |
| 2008/0218614 | A1 | 9/2008 | Joshi et al. |
| 2008/0316347 | A1 | 12/2008 | Gamal et al. |
| 2009/0002535 | A1 | 1/2009 | Park et al. |
| 2009/0066825 | A1 | 3/2009 | Nezaki et al. |
| 2009/0101798 | A1 | 4/2009 | Yadid-Pecht et al. |
| 2009/0244346 | A1* | 10/2009 | Funaki ............ H04N 5/37455 348/308 |
| 2010/0051786 | A1 | 3/2010 | Lotto et al. |
| 2010/0060765 | A1 | 3/2010 | Kim et al. |
| 2010/0079651 | A1 | 4/2010 | Lim |
| 2010/0134662 | A1 | 6/2010 | Bub |
| 2010/0140732 | A1 | 6/2010 | Eminoglu et al. |
| 2010/0187401 | A1* | 7/2010 | Kawahito ......... H01L 27/14609 250/208.1 |
| 2010/0194956 | A1 | 8/2010 | Yuan et al. |
| 2010/0277607 | A1 | 11/2010 | Choi et al. |
| 2010/0277631 | A1* | 11/2010 | Sugiyama ............ H04N 5/374 348/297 |
| 2011/0036989 | A1 | 2/2011 | Marks et al. |
| 2011/0050969 | A1 | 3/2011 | Nishihara |
| 2011/0074995 | A1 | 3/2011 | Rafferty et al. |
| 2011/0121421 | A1 | 5/2011 | Charbon et al. |
| 2011/0149274 | A1 | 6/2011 | Rissa et al. |
| 2011/0176019 | A1 | 7/2011 | Yang et al. |
| 2015/0015759 | A1 | 1/2015 | Kayahan et al. |

OTHER PUBLICATIONS

International Preliminary Report on Patentability dated May 22, 2014 (Chapter I) in International Application No. PCT/US2012/064190. 7 pages.
International Search Report and Written Opinion dated Jan. 28, 2013 in International Application No. PCT/US2012/064190. 13 pages.
Clark, R. N., "Digital Cameras: Does Pixel Size Matter? Factors in Choosing a Digital Camera (Does Sensor Size Matter?)," ClarkVision.com, Slideshow Presentation, Jun. 8, 2011. 36 pages.
Finkelstein et al., "STI-Bounded Single-Photon Avalanche Diode in a Deep-Submicrometer CMOS Technology," IEEE Electronic Device Letters, vol. 27, No. 11, Nov. 2006, pp. 887-889. 3 pages.
Fossum, Eric R., "Active Pixel Sensors: Are CCD's Dinosaurs?" SPIE vol. 1900, 1993, pp. 2-14. 13 pages.
Fossum, Eric R., "What to Do With Sub-Diffraction-Limit (SDL) Pixels?—A Proposal for a Gigapixel Digital Film Sensor (DFS)," 2004, Discussion Session, pp. 214-217. 4 pages.
International Preliminary Report on Patentability dated May 22, 2014 (ChapterI) in International Application No. PCT/US2012/064177. 6 pages.
International Search Report and Written Opinion dated Jan. 28, 2013 in International Application No. PCT/US2012/064177. 14 pages.
Kavusi et al., "A Quantitative Study of High Dynamic Range Image Sensor Architectures," Proc. SPIE, pp. 264-275, 2004. 12 pages.
Kavusi et al., "Architectures for High Dynamic Range, High Speed Image Sensor Readout Circuits," Proc. Very Large Scale Integration, 2006 IFIP International Conference, pp. 36-41. 6 pages.
Kavusi et al., "Folded Multiple-Capture: An Architecture for High Dynamic Range Disturbance-Tolerant Focal Plane Array," Proc. SPIE Infrared Technology and Applications, vol. 5406, pp. 351-360, 2004. 10 pages.
Kavusi et al., "Quantitative Study of High-Dynamic Range SigmaDelta-Based Focal Plane Array Architectures," Proc. SPIE Defense and Security Symp., pp. 341-350, 2004. 10 pages.
Kavusi et al., "A 0.18µm CMOS 1000 Frames/Sec, 138dB Dynamic Range Readout Circuit for 3D-IC IR Focal Plane Arrays," IEEE Custom Integrated Circuits Conference, pp. 229-232, Sep. 2006. 4 pages.
Kavusi, Sam et al., "Quantitative Study of High Dynamic Range Image Sensor Architectures", 2004: SPIE—The International Society for Optical Engineering, Proceedings of the SPIE, vol. 5301, p. 264-275, 2004. 12 Pages.
Kim et al., "A Dual-Capture Wide Dynamic Range CMOS Image Sensor Using Floating-Diffusion Capacitor," IEEE Transactions on Electron Devices, vol. 55, No. 10, pp. 2590-2594, Oct. 2008. 5 pages.
Kim et al., "PD-Storage Dual-Capture Variable Wide Dynamic Range CMOS Image Sensor," Electronic Letters, Nov. 10, 2011, vol. 47, No. 23. 2 pages.
Koppa et al., "A 105.6dB DR and 65dB Peak SNR Self-Reset CMOS Image Sensor Using a Schmitt Trigger Circuit," 2011 IEEE 54th International Midwest Symposium on Circuits and Systems (MWSCAS), pp. 1-4, Aug. 7-10, 2011. 4 pages.
Liu et al., "Synthesis of High Dynamic Range Motion Blur Free Image From Multiple Captures," IEEE Transactions on Circuits and Systems I: Fundamental Theory and Applications, vol. 50, No. 4, pp. 530-539, Apr. 2003. 10 pages.
Ohta, Jun, "Basic Pixel Structure," from Smart CMOS Image Sensors and Applications, Chapter 2.5: Fundamentals of CMOS Image Sensors, published Sep. 17, 2007, pp. 36-39. 2 pages.
Park et al., "Wide Dynamic Range and High SNR Self-Reset CMOS Image Sensor Using a Schmitt Trigger," Sensors, 2008 IEEE, pp. 294-296, Oct. 26-29, 2008. 3 pages.
Sbaiz et al., "The Gigavision Camera," IEEE Conference on Acoustics, Speech, and Signal Processing, Apr. 2009. 4 pages.
Spivak et al., "Power-Performance Tradeoffs in Wide Dynamic Range Image Sensors With Multiple Reset Approach," Journal of Low Power Electronics and Applications, 2011, vol. 1, pp. 59-76. 18 pages.
Veerappan et al., "A 160×128 Single-Photon Image Sensor with On-Pixel 55ps 10b Time-to-Digital Converter," 2011 IEEE International Solid-State Circuites Conference, Session 17, Biomedical and Displays, Paper 17.7, pp. 312-314. 3 pages.
Yang et al., "Gigapixel Binary Sensing: Image Acquisition Using Oversampled One-Bit Poisson Statistics," Draft, May 17, 2011. 33 pages.
Yang, Feng et al., "Bits from Photons: Oversampled Image Acquisition Using Binary Poisson Statistics", IEEE Transac-tions on Image Processing, vol. 21, No. 4, pp. 1421-1436, Apr. 2012. 16 pages.

\* cited by examiner

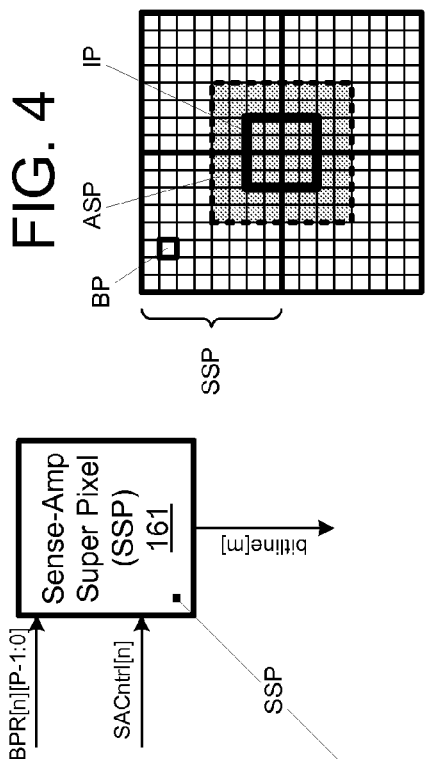
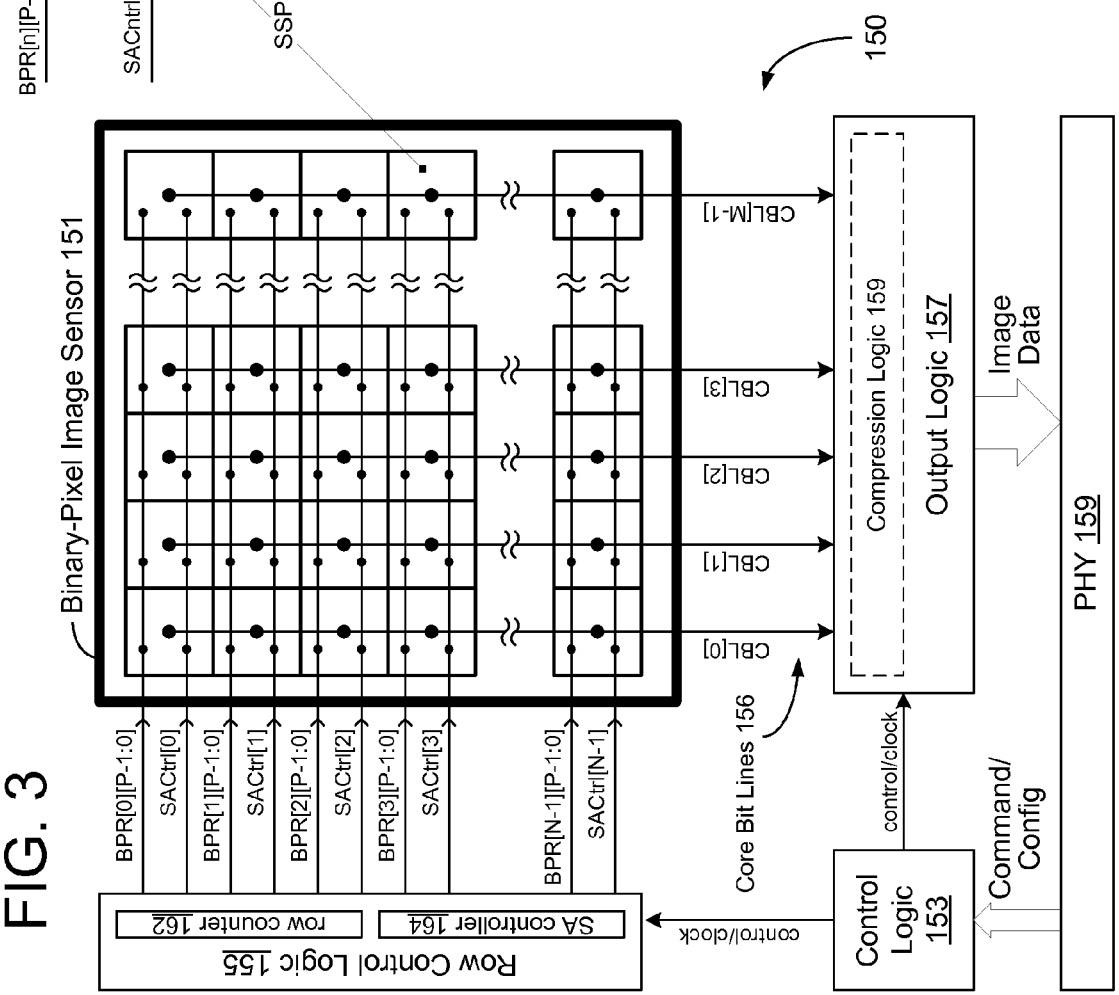

Image Pixel Generation

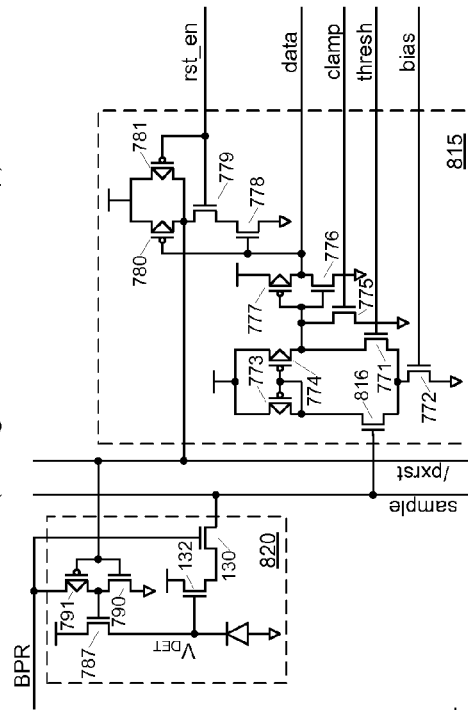
FIG. 14C (voltage-mode sense-amp)
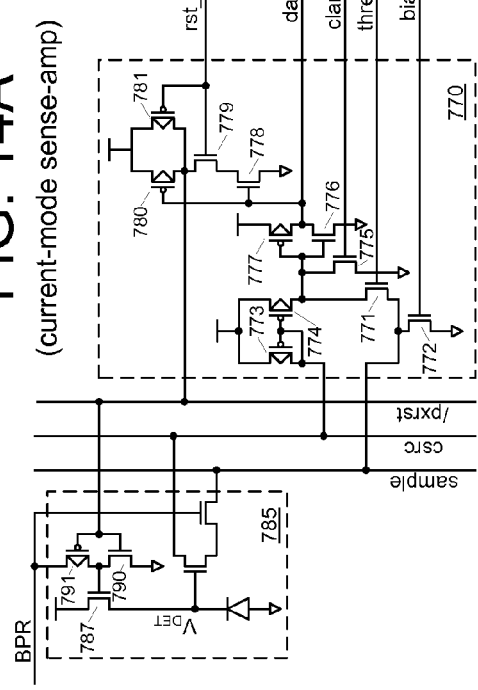
FIG. 14A (current-mode sense-amp)
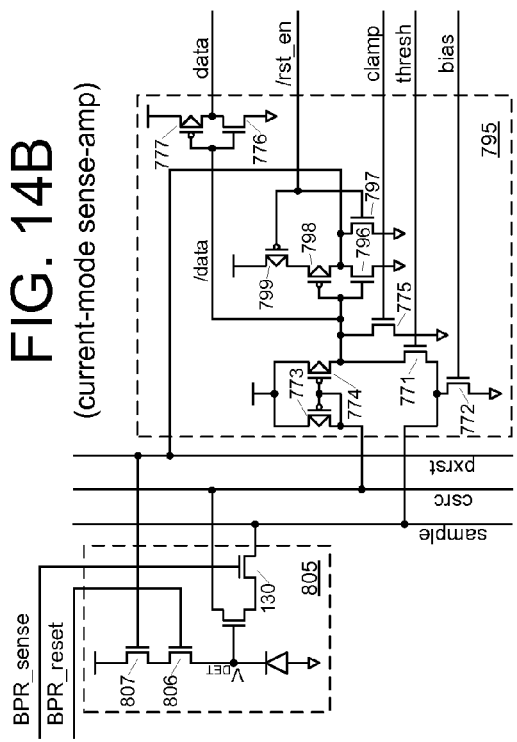
FIG. 14B (current-mode sense-amp)

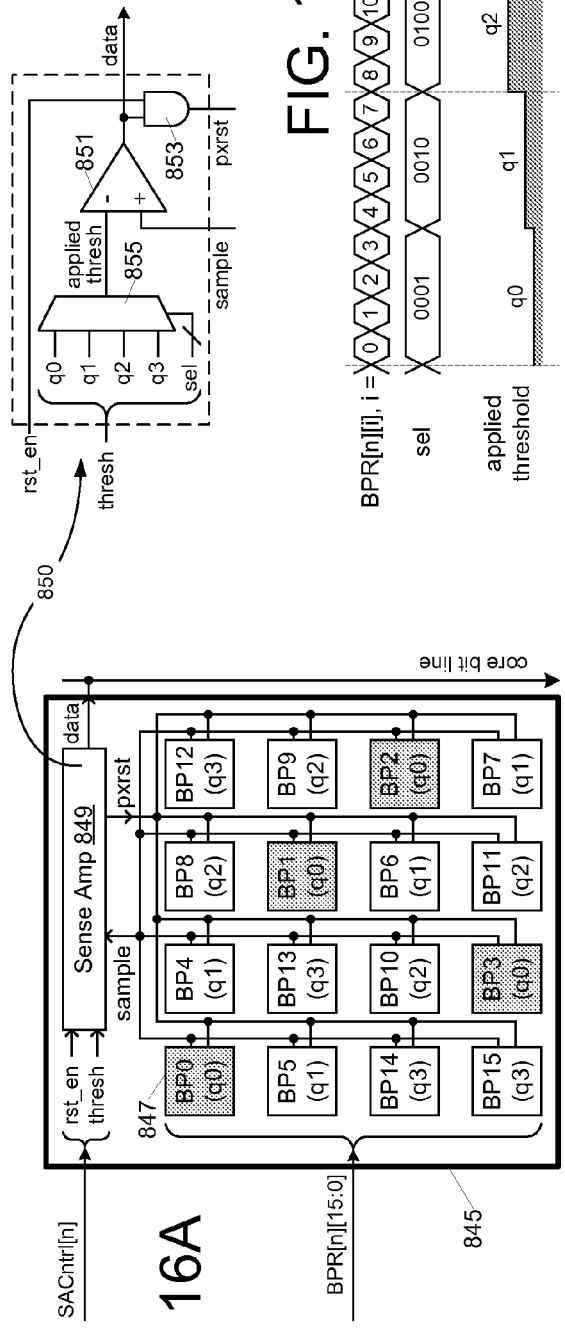
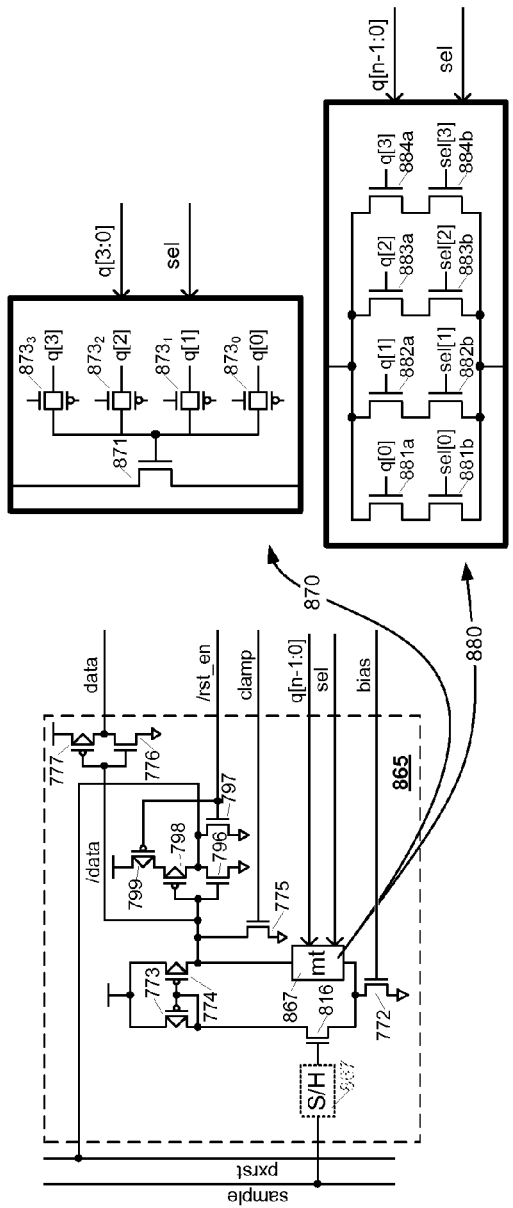
FIG. 16A
FIG. 16B
FIG. 17

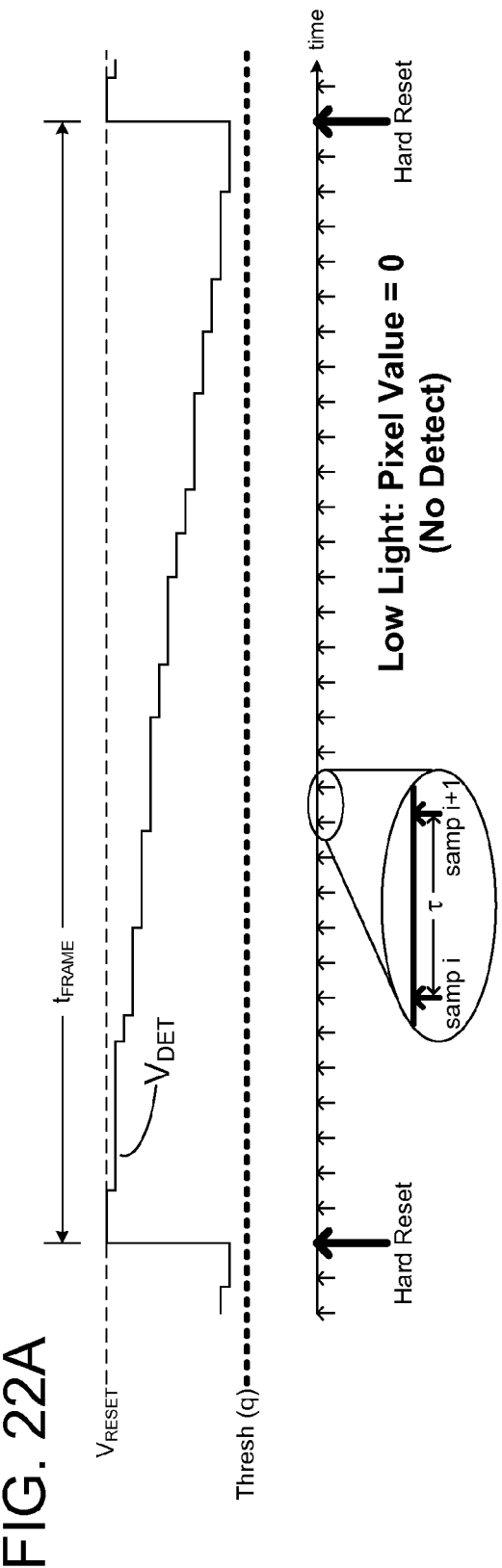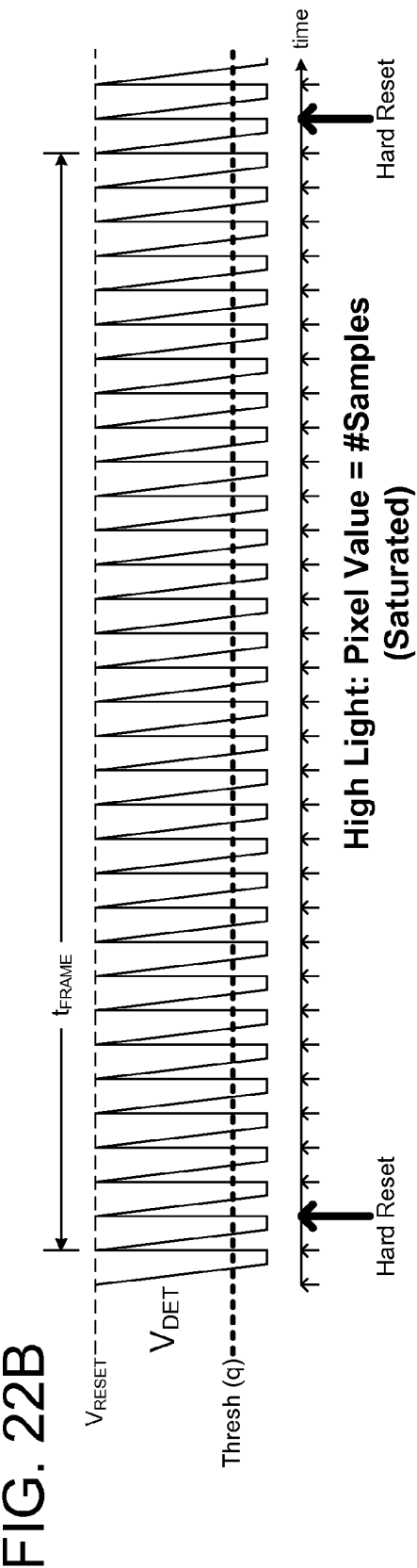
FIG. 22A
FIG. 22B

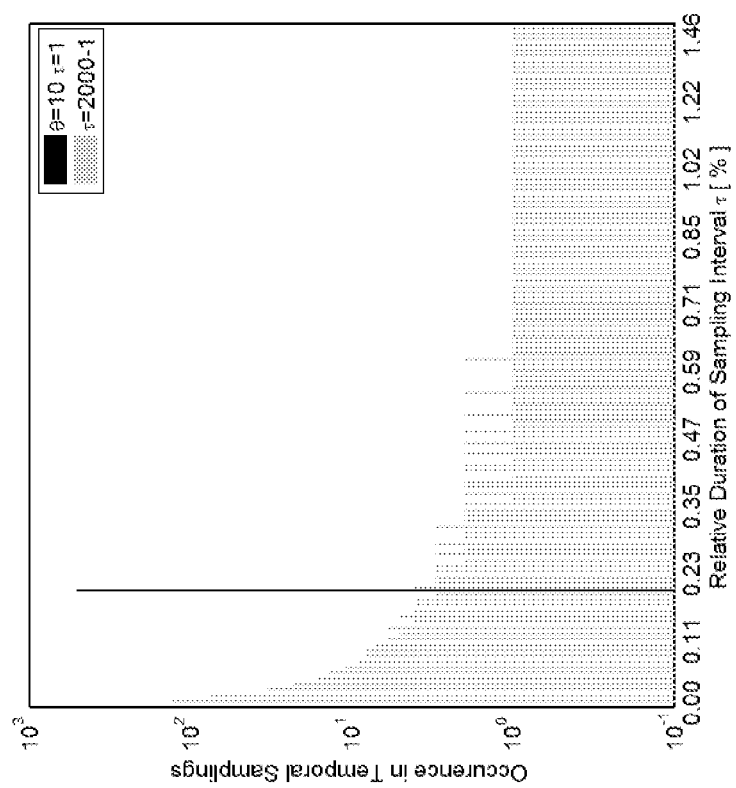
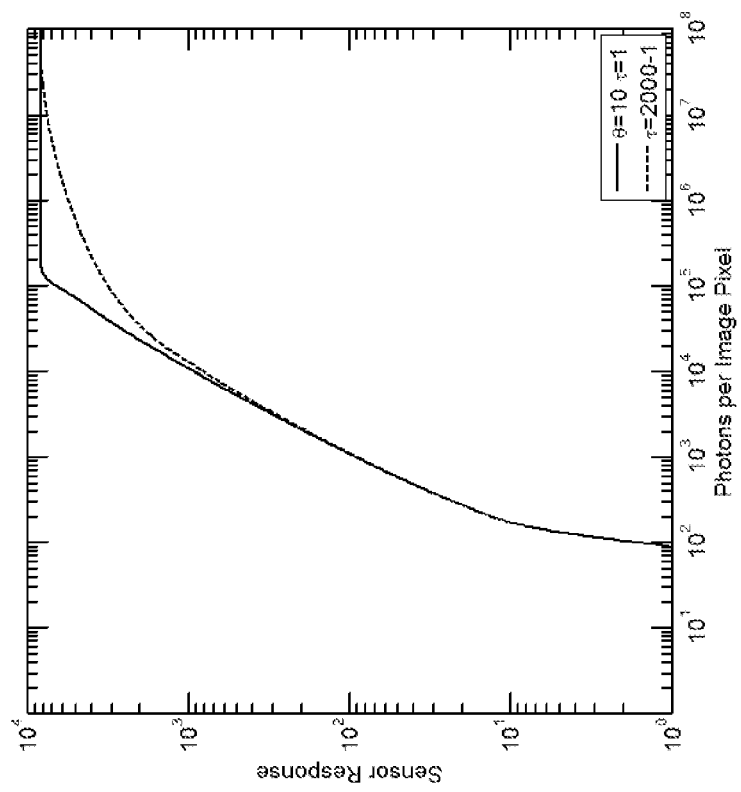
FIG. 27B
FIG. 27A

FIG. 28  Threshold and Photon Sequence

FIG. 29  Example threshold and sampling interval reduction

| Initial | | Monotonic | | Reduced | |
|---|---|---|---|---|---|
| Thresholds | Durations | Thresholds | Durations | Thresholds | Durations |
| 4 | 1 | 2 | 1 | 2 | 5 |
| 2 | 4 | 2 | 4 | 3 | 8 |
| 3 | 2 | 3 | 2 | 5 | 1 |
| 5 | 1 | 3 | 1 | | |
| 3 | 5 | 3 | 5 | | |
| 5 | 1 | 5 | 1 | | |

IMAGE SENSOR SAMPLED AT NON-UNIFORM INTERVALS

CROSS REFERENCE TO RELATED APPLICATIONS

Pursuant to 35 U.S.C. §§365 and 371, this application is a United States National Stage Application that claims priority to International Application No. PCT/US2012/064190 filed Nov. 8, 2012, which claims the benefit of each of the following U.S. Provisional Patent Applications: Application No. 61/557,364 filed Nov. 8, 2011; Application No. 61/557,368 filed Nov. 8, 2011; Application No. 61/580,189 filed Dec. 23, 2011; Application No. 61/643,172 filed May 4, 2012; and Application No. 61/684,117 filed Aug. 16, 2012. Each of the above-identified patent applications is hereby incorporated by reference in its entirety.

INCORPORATION OF PRIORITY APPLICATIONS

This application hereby incorporates by reference the entirety of any and all patent applications to which priority is claimed, for example and without limitation, in a constituent PCT Request or Application Data Sheet.

TECHNICAL FIELD

The present disclosure relates to the fields of electronic image sensors and digital image processing.

BACKGROUND

Conventional digital image sensors are organized in rows and columns of pixels as shown in sensor cutaway 100 of FIG. 1. In a CMOS sensor, each pixel includes a photo diode 103 together with control elements that enable the photo diode to be precharged in preparation for exposure and then sampled after exposure. In the simple pixel shown at 101, transistor 109 is switched on to couple the cathode of the photo diode to a voltage source and thus "precharge" the cathode of the photo diode to a precharge voltage. Transistor 109 is switched off at or before the start of an exposure interval. With transistor 109 off, the cathode voltage incrementally discharges in response to photon strikes, lowering the photo diode potential, $V_{DET}$, in proportion to the amount of light detected. At the conclusion of the exposure interval, access transistor 105 is switched on to enable the photo diode potential to be amplified/driven onto a column line via follower-transistor 107 and delivered to an analog-to-digital converter 111 (ADC) disposed at the edge of the pixel array. The ADC digitizes the incoming analog voltage ($V_{SAMP}$) to generate a multi-bit pixel value that ranges between minimum and maximum values corresponding to no-light and saturated conditions, respectively. These precharge and sample operations are conducted for each row of image sensor 100 to recover a digitized image.

Despite their ubiquitous application in modern imaging devices, conventional CMOS image sensors suffer from a number of limitations. First, conveying analog pixel voltages to the edge of the sensor array over long, high-capacitance column lines typically requires in-pixel amplification, increasing pixel complexity and size and limiting sensor sensitivity in low-light conditions. Also, the linear relationship between photon strikes and pixel value (shown at 114) yields a relatively small dynamic range in which a pixel quickly reaches saturation under brightening conditions. Perhaps more significantly, the maximum number of detectable photon strikes (i.e., the pixel saturation point) is proportional to the capacitance of the photo diode and thus its physical size. Consequently, the photo diode footprint is dictated by the dynamic range required in a given application and does not scale with shrinking process geometries. In high-end digital cameras, like DSLRs (digital single-lens reflex) for example, the photo diode tends to be four or more micrometers at each edge in order to achieve a reasonable dynamic range, consuming an area hundreds or even thousands of times the minimum transistor size permitted by leading logic process geometries.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIG. 3 illustrates an embodiment of an integrated-circuit image sensor (image sensor IC) having a binary-pixel image sensor together with circuitry to manage sensor operations and communicate with a host integrated circuit;

FIG. 4 illustrates an example of an algorithmic super pixel (ASP), showing its binary pixel composition and corresponding image pixel (IP);

FIG. 5 illustrates an embodiment of a sense-amplifier that can be embedded within a sense-amp super pixel;

FIGS. 14A-14C illustrate embodiments of conditional-reset sense amplifiers and corresponding binary pixels that may be employed to achieve variable temporal oversampling within a binary pixel image sensor;

FIG. 16A illustrates an embodiment of a conditional-reset sense-amp super pixel that applies multiple reference voltages to respective subsets of binary pixels to effect spatially-distributed, non-uniform thresholds;

FIG. 16B illustrates an exemplary read-out sequence that may be executed with respect to the conditional-reset sense-amp super pixel of FIG. 16A;

FIG. 17 illustrates an embodiment of a multi-thresholding, conditional-reset sense amplifier that may be employed within the SSP of FIG. 16A;

FIGS. 22A and 22B illustrate operation of a conditional-reset binary pixel sensor in low-light and high-light conditions;

FIG. 27A illustrates a sensor response corresponding to the logarithmic progression of the temporal sampling interval (i.e., logarithmically shortening the sampling interval, τ), showing that the dynamic range is extended well beyond the point at which a uniform sampling sensor saturates;

FIG. 27B illustrates the relative duration of individual values of the sampling interval (τ) as a percentage of the frame interval, and the number of occurrences of each;

FIG. 28 shows examples of the influence of sequences of thresholds and photon arrivals;

FIG. 29 illustrates an example of threshold and sampling interval reduction;

DETAILED DESCRIPTION

In various digital image sensor embodiments disclosed herein, one or more sub-diffraction-limit (SDL) pixels are clustered together with an embedded sense amplifier and sensed with respect to a binary threshold to yield a collection of single-bit pixel values that can be combined to form the output of an image pixel. Because integrated-circuit (IC) process geometries permit pixel sizes below the diffraction limit of visible light, a photon striking within a SDL cluster of such "binary" pixels may activate (i.e., be detected by and exceed the threshold of) one binary pixel but not others illuminated by the same blurred source, thus decreasing the number of non-activated pixels available to detect subsequent photons from the source. Consequently, when exposed to a stationary photon flux, the rate of pixel activation slows as the exposure interval transpires (i.e., due to photons striking already activated pixels), thereby yielding a logarithmic rather than linear sensitivity profile and thus a potentially much higher dynamic range than achieved through prior-art techniques (in other embodiments disclosed herein this behavior is modified while still improving dynamic range). Further, because the pixels can be scaled with decreasing process geometries, pixel densities can increase freely with process improvement, thus overcoming physical impediments faced by conventional architectures and enabling dramatically higher performance in future generations of imaging devices. These and other advantages, features and embodiments are described below.

Overview of a Binary-Pixel Image Sensor

Figure 1:
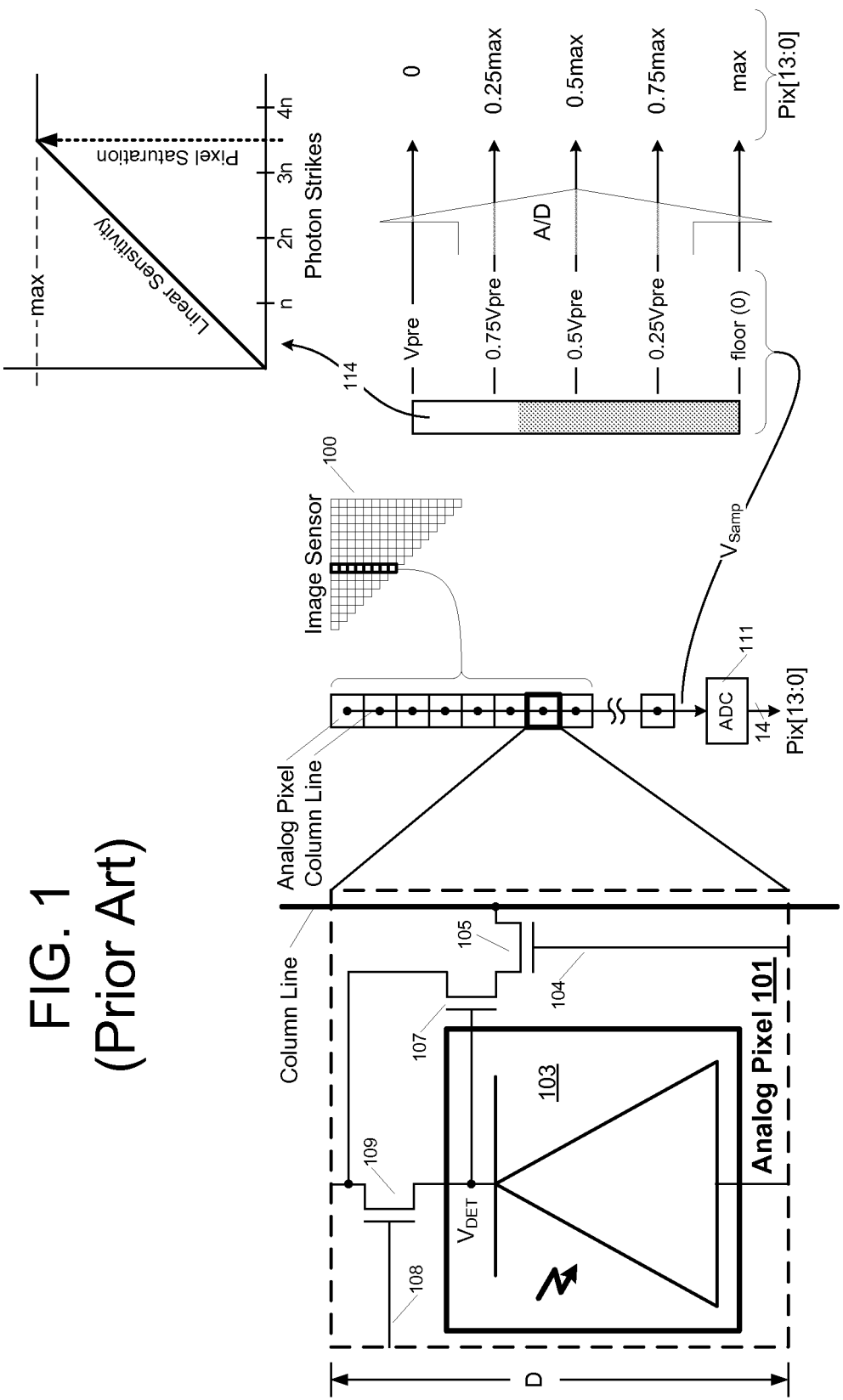
FIG. 1 illustrates a prior-art image sensor.
Figure 2:
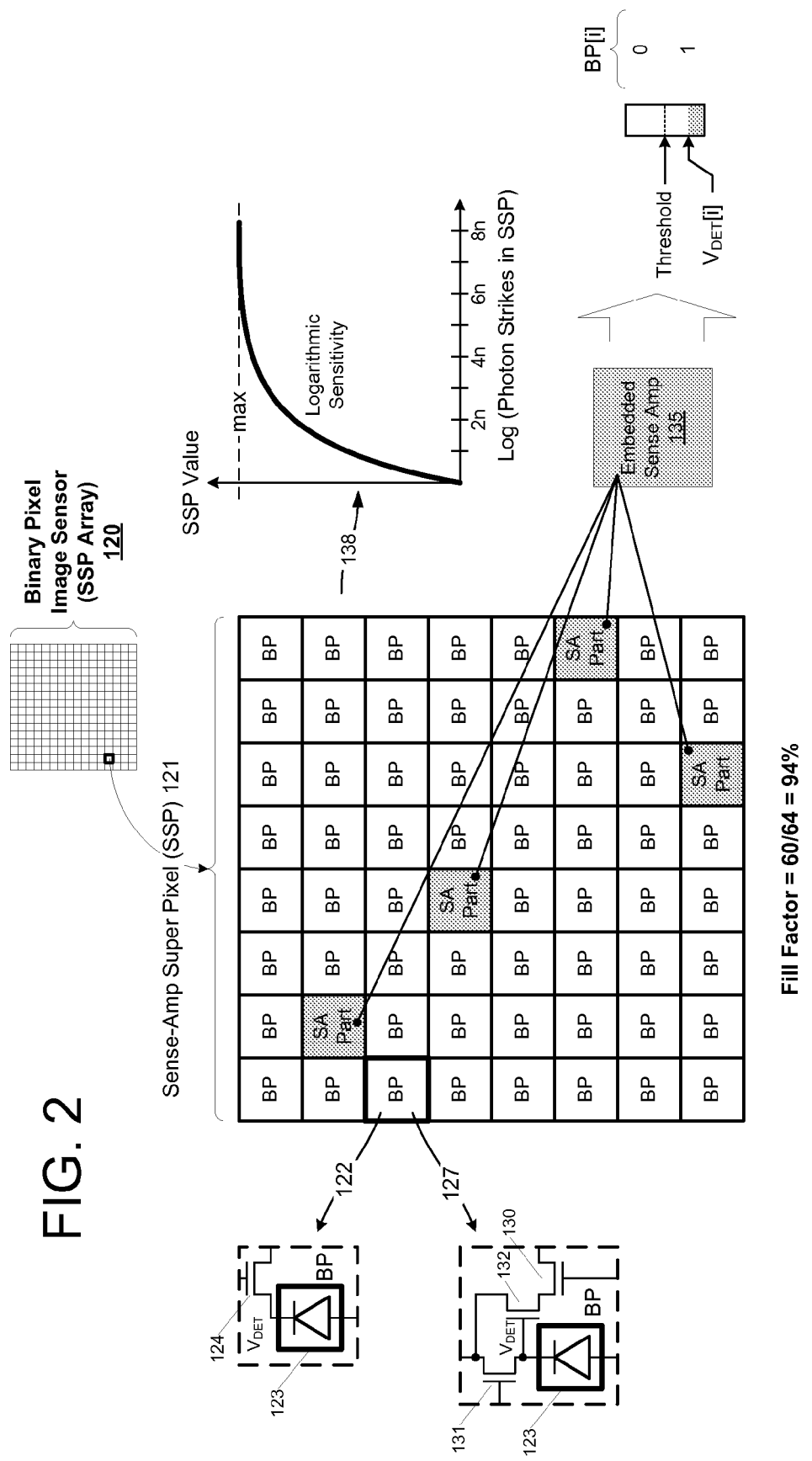
FIG. 2 illustrates an embodiment of a binary-pixel image sensor formed by an array of sub-diffraction-limit (SDL) pixels each of which is operated with respect to a binary detection threshold.

FIG. 2 illustrates an embodiment of an image sensor 120 formed by an array of sub-diffraction-limit pixels each of which is operated with respect to a binary detection threshold and thus as a "binary pixel." Although theorized, hardware implementations of SDL pixels have long been deemed impractical in part because their small output voltage falls well below the noise floor imposed by the relatively long, high-capacitance path (i.e., bit line) to sense circuitry at the edge of the array. By embedding sense amplifiers within or adjacent to respective clusters of SDL pixels, however, and sampling the pixels as digital rather than analog data sources (i.e., sampling the pixels with respect to a binary threshold and thus as binary pixels), such noise impediments can be overcome, enabling construction of image sensors having pixel densities that scale with process improvements and superlative dynamic range.

In the embodiment of FIG. 2 and a number of embodiments below, the pixel image sensor 120 is composed of elemental pixel regions referred to herein as sense-amp super pixel (SSPs), each of which includes an embedded sense amplifier and a cluster of binary pixels. In the SSP shown at 121, for example, a cluster of 60 binary pixels ("BP") is coupled to an embedded sense amplifier 135 formed by transistors that are dispersed within the overall footprint of the SSP. More specifically, assuming that each binary pixel consumes a predefined amount of die area, referred to herein as a "pixel cell," sense amplifier 135 is formed by elements within 4 out of 64 pixel cells within the 8-cell by 8-cell (8×8) SSP shown. In other embodiments, a number of which are discussed below, more or fewer binary pixels can be included within each SSP and more or fewer pixel cells can be required by the embedded sense amplifier, yielding a correspondingly higher or lower fill factor than that shown (i.e., higher or lower ratio of light detecting area to the total area occupied by the SSP). An SSP can also have an oblong rather than square aspect and more generally can have a non-quadrilateral footprint (e.g., a hexagonal footprint as discussed below). The sense amplifier circuitry embedded within a given SSP may also be disposed at the periphery of the pixel cluster (and thus positioned between multiple pixel clusters) or disposed within a consolidated region of the SSP (e.g., in the center of the pixel cluster) instead of being scattered among disjointed pixel cells. Multiple sense amplifiers may serve an SSP, or a sense amplifier can serve all or portions of several SSPs.

In one embodiment, each binary pixel within SSP 121 is formed by a passive pixel (i.e., no amplification) as shown at 122 and thus with only one or two control transistors (e.g., a single transistor 124 to enable precharge and data access at different times) and a photo diode 123 or other light-detecting element. As a result, the overall pixel area is substantially smaller than a conventional analog pixel, ranging, for example, from roughly 25% of the area consumed by a conventional pixel having a moderate-dynamic-range to less than 1% of a higher dynamic-range conventional pixel.

In alternative embodiments, each binary pixel within SSP 121 can be an active pixel having one or more transistors to provide signal amplification and thus be slightly larger than passive pixel 122, though still substantially smaller than a conventional analog pixel. An embodiment of such an active pixel is shown at 127 with transistor 131 being switched on to couple the cathode of photo diode 123 (or other light-detecting element) to a precharge voltage source, transistor 132 operating as a follower-amplifier (e.g., providing unity gain, though the gain may be greater than or less than one) and transistor 130 enabling the output of the follower transistor, a representation of the photo diode voltage, to be output from the binary pixel. Note that follower transistor 132 presents a high-impedance load to the cathode of photo diode 123 so that the cathode voltage, $V_{DET}$, is undisturbed when access transistor 130 is turned on. By contrast, in passive binary pixel 122, the voltage on the cathode is discharged onto a bit line when access transistor 124 is switched on, thus destroying the binary pixel state. Accordingly, the active and passive binary pixels exhibit non-destructive and destructive sense characteristics, respectfully, and can be applied in different embodiments based on that distinction.

In other alternative embodiments, the photo-generated charge can be collected in the body region of a MOS (metal oxide semiconductor) transistor, changing its conductance and thus providing a single transistor pixel with amplification. More generally, various other photo-detection structures may be used instead of or in addition to the photo diodes shown within pixels 122 and 127.

While pixel operations can be executed in any order and degree of concurrency permitted by the underlying architecture, precharge, exposure and sense operations within the embodiment of FIG. 2 and a number of embodiments below are generally carried out sequentially with respect to the binary pixels within a given SSP and in parallel across rows of SSPs or even multiple rows of SSPs. Referring to the SSP shown, for example, the constituent pixels can be precharged one after another through assertion of respective row-control lines (e.g., coupling a precharge voltage present on a local bit line of the SSP to the cathode of photo diode 123 via transistor 124 within passive pixel 122, and coupling a precharge voltage source to the photo-diode cathode via dedicated precharge transistor 131 within active pixel 127), and then allowed to accumulate light over an exposure interval of variable duration. At the conclusion of the exposure interval, the photo diode voltages of respective binary pixels are sensed one after another within embedded sense amplifier 135. In each such sense operation, the embedded sense amplifier compares the selected cathode voltage (i.e., $V_{DET}[i]$, where 'i' is the index of the binary pixel within the SSP) with a predetermined threshold to obtain a one-bit binary pixel value BP[i]. As explained in detail below, individual binary pixel values sensed within one or more SSPs can be combined by logic circuitry on and/or off the image sensor IC to yield a multi-bit value that corresponds directly or approximately to the number of binary pixels that detected sufficient light to exceed the binary threshold (e.g., struck by a single photon or some number of photons) and thus a representative value for a selected collection of binary pixels within image sensor 120.

Over the course of an exposure interval, the number of undischarged binary pixels within a given area declines, diminishing the likelihood that a subsequent photon will strike an undischarged pixel and be detected. This dynamic contraction of the photon detection area yields a logarithmic sensitivity profile as shown at 138 and thus the potential for significantly broader dynamic range than achieved by the analog photon counting approach of conventional image sensors.

Overview of an Integrated Circuit Having a Binary-Pixel Image Sensor

FIG. 3 illustrates an embodiment of a sensor IC 150 having a binary-pixel image sensor 151 together with circuitry to manage sensor operations and communicate with a host IC. More specifically, a physical signaling interface 159 is provided to receive commands and configuration information from a host IC (e.g., a general-purpose or special-purpose processor, application-specific integrated circuit (ASIC) or any other control component) and control logic 153 is provided to execute incoming commands within an operating configuration set in response to the configuration information. For purposes of example, the sensor IC and host IC are assumed to form the primary image acquisition components within a camera (e.g., a still-image or video camera within a mobile device, compact camera, digital SLR camera, stand-alone or platform-integrated webcam, high-definition video camera, security camera, automotive camera etc.). The sensor IC and host IC can be more generally deployed alone or together with like or different imaging components within virtually any imaging system or device including without limitation metrology instruments, medical instruments, gaming systems or other consumer electronics devices, military and industrial imaging systems, transportation-related systems, space-based imaging systems and so forth.

Continuing with FIG. 3, control logic 153 issues control and clock signals to row control logic 155 and output logic 157. As shown, the row control logic includes a row counter 162 to sequence through the rows of SSPs 161 within the image sensor during image acquisition and read-out operations, and a sense-amp controller 164 to control sensing for respective SSPs during those operations. Output logic 157 serializes data read-out from image sensor 151 for transmission over a relatively narrow external signal path. As shown, the output logic can include compression logic 159 to compress the volume of data received from the image sensor and thus reduce signaling bandwidth requirements.

Still referring to FIG. 3, binary-pixel image sensor 151 is composed of N rows and M columns of sense-amp super pixels (SSPs), with each SSP including an embedded sense amplifier and P binary pixels. Row counter 162 outputs N sets of P row signals, with each set of P row signals coupled to the binary pixels that populate a logical or physical row of SSPs. More specifically, each signal within the set of P row signals is coupled to a respective one of the P binary pixels within each SSP of the row, thereby enabling M like-positioned binary pixels within respective SSPs of a given row to be selected as a group during precharge and sense operations. The logical collection of binary pixels selected in response to assertion of a given one of the row signals is referred to herein as a "binary pixel row" to distinguish it from the rows of SSPs themselves (which each may contain one or more binary pixel rows). The individual row signals are referred to accordingly as binary-pixel-row (BPR) signals with each set of P BPR signals being indexed by a respective SSP row index 'n' that ranges from 0 to N−1, and each BPR signal within a given set of P BPR signals being further indexed by a binary pixel index, 'p' that ranges from 0 to P−1.

In one embodiment, row control logic 155 includes state logic that sequences between states to control the operation of row counter 162 and sense amp controller 164, for example, incrementing row counter 162 to select the next binary pixel row in an incremental progression after enabling sense amp controller 164 to complete a sequence of operations with respect to the binary pixels of the currently indexed binary pixel row. The sense-amp controller itself outputs respective sets of sense amp control signals (SACtrl [N−1:0]) to the rows of SSPs with each set of sense-amp control signals including constituent signals to enable the embedded sense amplifiers within a selected SSP row to be operated in parallel, in one embodiment for example, sequencing as a unit through precharge, sense and read-out states as detailed below.

Reflecting on the image sensor architecture shown in FIG. 3, it can be seen that a significant number of conductors can overlay the image sensor to instantiate the BPR lines, sense-amp control lines and core bit lines shown. In one embodiment, the backside of the die on which the image sensor is formed is ground (or lapped or otherwise thinned) to a thickness that permits pixel exposure through the backside of the die, thereby enabling accumulation of light unimpeded by the image sensor wiring. In such an embodiment, the front-side of the ground die can be adhered to a substrate or to the die of another IC (e.g., a host IC) to provide mechanical stability.

Algorithmic Super Pixels and Image Pixels

Although the binary pixel values read out of a binary-pixel image sensor may themselves constitute a finalized image in some applications, in other applications spatially localized collections of binary pixels, referred to herein as "algorithmic super pixels," are combined to produce representative "image pixel" values. FIG. 4 illustrates an example of an algorithmic super pixel (ASP), showing its binary pixel composition and corresponding image pixel (IP). In the example shown, the ASP (marked by shaded binary pixels) includes an 8×8 collection of binary pixels drawn from four different SSPs. In alternative embodiments, the ASP may be coextensive with the SSP (i.e., formed exclusively by the binary pixels of an SSP). Also, ASPs can overlap one another and thus include binary pixels in common, or they can be formed by exclusive sets of binary pixels, a characteristic parameterized by the "ASP pitch", a measure of the spacing between ASP centers in units of pixel pitch. Because the image pixel is a representation of the ASP value (i.e., a combination of the values of the binary pixels that constitute the ASP), physical depiction of the image pixel is, to some extent, an abstraction. In the example shown, the ASP pitch is assumed to be four binary pixels in both dimensions, so that the image pixel is centered within a 4×4 pixel region. In alternative embodiments, the image pixel may be coextensive with the ASP (i.e., no overlap between ASPs).

While the ASP shown in FIG. 4 has the same form-factor as an underlying SSP (i.e., matching the shape and dimension), this need not be the case. For example, square ASPs can be extracted from a sensor formed from an underlying set of oblong SSPs.

FIG. 5 illustrates an embodiment of a sense-amplifier 181 that can be employed, together with multiple instances of the active binary pixel shown, to form a sense-amp super pixel. Instead of employing back-to-back inverters (as may be done in an alternative embodiment), the sense amplifier is formed by a differential amplifier. Thus, no latching operation occurs, avoiding the need for a sense amp precharge operation. Also, the amplification transistor 132 within active binary pixel 127 operates as the input transistor of the differential pair, in effect distributing a portion of the differential amplifier within the binary pixels of the SSP (in alternative embodiments, a dedicated input transistor may be provided within the sense amplifier as a counterpart to transistor 183).

Due to the potentially imbalanced legs of the differential amplifier (i.e., one leg effected through the binary pixel and local bit lines 184a and 184b (LBL0 and LBL1) and thus through a longer signal path than the other leg, which is confined within the locale of the sense amplifier), transistors 185a and 185b are coupled in a current mirror configuration to establish matching current sources for the two legs. Accordingly, when a bias voltage is applied to transistor 187, powering the sense amplifier, a differential voltage is developed on differential nodes 186a, 186b according to whether the pixel voltage (i.e., the voltage at the detection node of photosensitive element 123) is greater or less than a threshold voltage applied to the gate of transistor 183. More specifically, complement-data node 186b drops to a lower potential than counterpart node 186a if the pixel voltage is below the threshold (i.e., transistor 132 will exhibit a lower transconductance (higher resistance) than transistor 183 due to the difference in their gate voltages and thus effect a higher IR drop than transistor 183) and conversely rising to a higher potential than node 186a if the pixel voltage is above the threshold. An inverter formed by transistors 189 and 191 amplifies the potential on complement-data node 186b, outputting a data signal representative of the binary pixel state to a core bit line as shown. Although not specifically shown, sense amplifier 181 may also include circuitry to disable current flow through the differential pair formed by transistor 183 and pixel transistor 132 when not sensing (e.g., by grounding the bias input or decoupling the sense amplifier from the V+ supply) and also to clamp/data node 186b. Also, the bias voltage itself can be implemented in a global current mirror circuit that is shared by the sense amplifiers within all or a subset of the SSPs in an image sensor. Note also that by providing a counterpart to transistor 183 within the sense amplifier, a single bit line connection to the binary pixel may be used (instead of the two connections shown) and a passive pixel can be used instead of the active pixel shown.

Still referring to FIG. 5, a pixel reset (precharge) operation is executed in response to a global reset signal ("reset") that is supplied to reset transistors 131 within all the binary pixels of an SSP, thus enabling all the pixels of the SSP (or those of an entire row of SSPs or even all SSPs in the image sensor) to be precharged (reset) simultaneously. In such an embodiment, exposure control (i.e., control over the time between pixel reset and read-out operations) can be carried out with SSP row granularity.

SSP Variants and Color Image Acquisition

Figure 7:
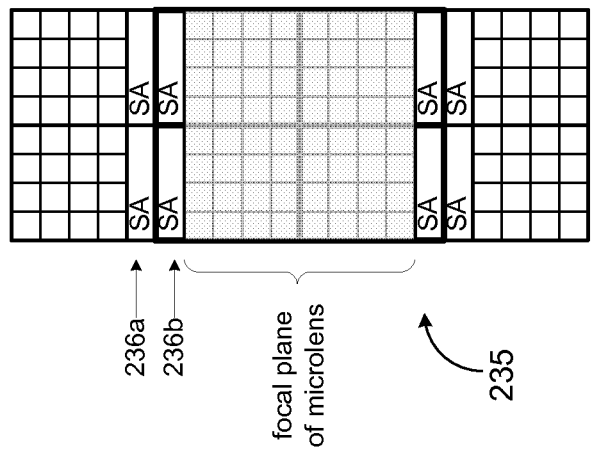
FIG. 7 illustrates another alternative embodiment of a binary pixel image sensor having embedded sense amplifiers disposed at edges of respective sense-amp super pixels, but with sense amplifiers corresponding to respective physical rows of sense-amp super pixels disposed side by side instead of offset by the sense-amp super pixel pitch.
Figure 6:
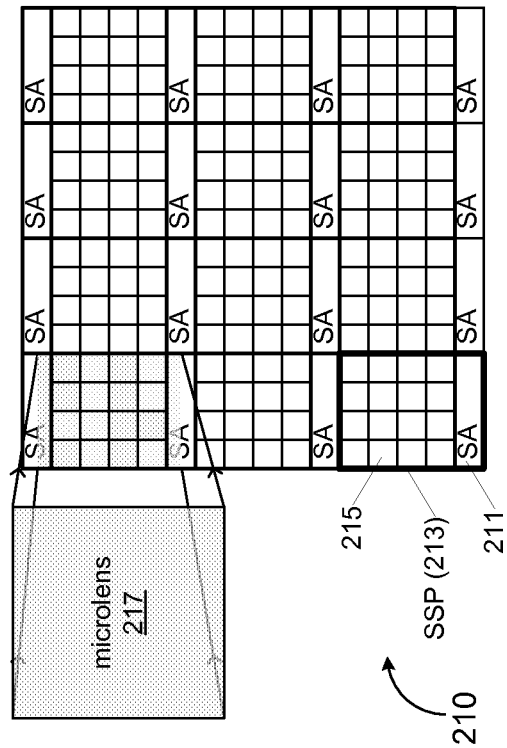
FIG. 6 illustrates an alternative embodiment of a binary pixel image sensor having embedded sense amplifiers disposed at edges of respective sense-amp super pixels.

FIG. 6 illustrates an alternative embodiment of a binary pixel image sensor 210, in this case having sense amplifiers 211 embedded within the pixel array, but disposed at edges of respective sense-amp super pixels 213 rather than distributed among the SSP's binary pixels 215. As shown, this architecture results in a sense-amp stripe extending parallel to the row lines of the sensor (or to the bit lines of the sensor in an alternative embodiment). To avoid artifacts in the sensed image, microlenses 217 or other light-focusing or light-directing structures can be disposed over the sensor array to direct light onto the binary pixels of a given SSP and away from the sense amp stripes. To enlarge the focal plane of each microlens and thus reduce the number of microlenses required, sense amp stripes 236a, 236b corresponding to different physical rows of SSPs may be disposed side by side (i.e., in contiguous or abutting regions) as shown by sensor architecture 235 in FIG. 7. As mentioned in reference to FIG. 6, the sense amplifier stripes may alternatively extend in a column direction, parallel to and potentially disposed beneath the bit lines extending across the sensor array In an alternative embodiments each or any of the embedded sense amplifiers ("SA") shown in FIG. 6 may serve two or more different "color" groups of binary pixels, each of which forms part of a respective ASP. A respective color filter for a Bayer or other CFA (color filter array) is applied to the group of pixels that constitute a given ASP. In one embodiment, for example, each CFA group is split between neighboring SSPs and is thus served by an upper sense amplifier and a lower sense amplifier. Within a given SSP, the lower half of a first CFA group is served by a sense amplifier below the CFA group and the upper half of a second CFA group, located below the sense amplifier, is also served by the sense amplifier. Thus each CFA group relies on two sense amplifiers to sense the values developed within the binary pixels in that CFA group.

More generally, a red-green-blue (RGB) color filter or any other color filter can overlay a binary-pixel image sensor to enable color image acquisition. In embodiments in which the filter granularity is fine enough to establish a variegated color field for constituent binary pixels of an SSP with the color pattern repeated across SSP rows, red, green and blue image information (or other color information) can be read-out from a row of SSPs in accordance with the binary-pixel-row line asserted. In alternative embodiments, the filter granularity may correspond to the SSP granularity and/or to the ASP granularity so that the binary pixels that constitute a given SSP (and/or a given ASP) deliver red, green or blue binary pixel data (or other color information) uniformly.

Spatial and Temporal Oversampling

Figure 8:
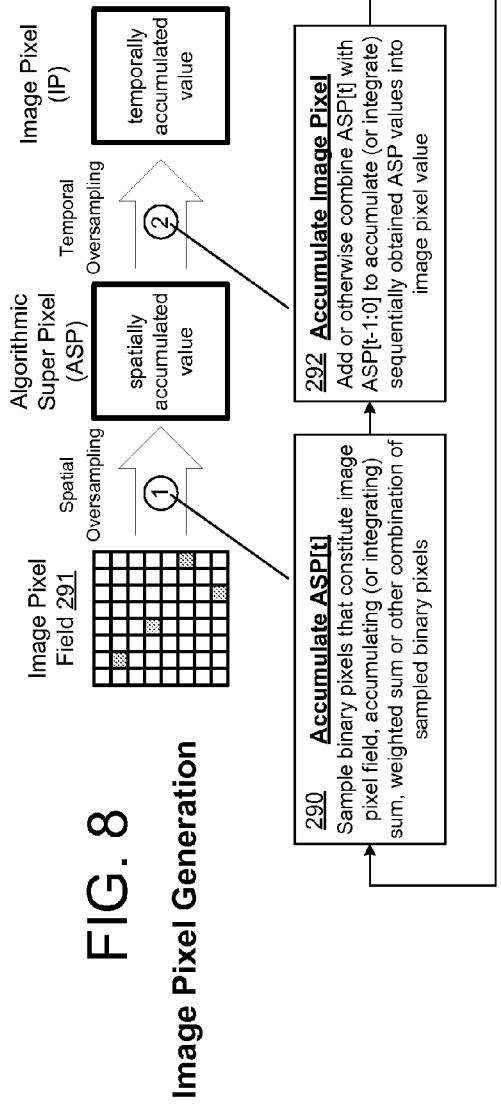
FIG. 8 illustrates an exemplary set of operations that can be used to generate an image pixel within an imaging system or component having a binary-pixel image sensor.

FIG. 8 illustrates an exemplary set of operations that can be used to generate an image pixel within an imaging system or component having a binary-pixel image sensor. Initially, at 290, the binary pixels that constitute an image pixel field are sampled (i.e., sensed) and accumulated or integrated to form a sum, weighted sum or other combined value. This combined value constitutes an ASP sample at a given sampling interval, t, and is thus designated ASP[t]. In effect, the ASP sample constitutes a spatial oversampling of the underlying binary pixels, an oversampling that can be increased or decreased according to the degree of spatial overlap between ASPs and thus according to the ratio of the ASP size and pitch. As shown by the shaded pixel cells in the image pixel field 291, one or more cells within the image pixel field can be allocated to sense amplifier functions and thus contain null-data from the standpoint of the accumulated ASP sample.

Continuing with FIG. 8, at 292, the ASP sample generated at 290, ASP[t], is added or otherwise combined with previously acquired ASP samples (ASP[t−1:0]) to accumulate an image pixel (IP). If the ASP sample is the last in the temporal sequence (affirmative determination at 294), the image pixel is deemed to be complete. Otherwise, the temporal index, t, is incremented as 296, the next ASP sample is generated at 290 and combined with the partially accumulated image pixel value at 292. By iterating in this manner, T sequentially acquired ASP samples, ASP[0] through ASP[T−1], are combined to form the finalized image pixel, thus effecting a temporal oversampling of the spatially oversampled binary pixels that constitute the image pixel field.

In view of the potentially large number of binary pixel samples combined to form each image pixel, and the relatively high image resolution demanded in modern imaging applications, it follows that a voluminous quantum of image data can be retrieved from a binary-pixel image sensor per image frame. Multiplying the quantum of binary pixel data per image frame by the nominal frame rate for a given imaging application yields the overall data bandwidth requirement of the binary-pixel image sensor and, if all binary pixel data is to be exported to a host IC, the signaling bandwidth of the image sensor IC.

Figure 9:
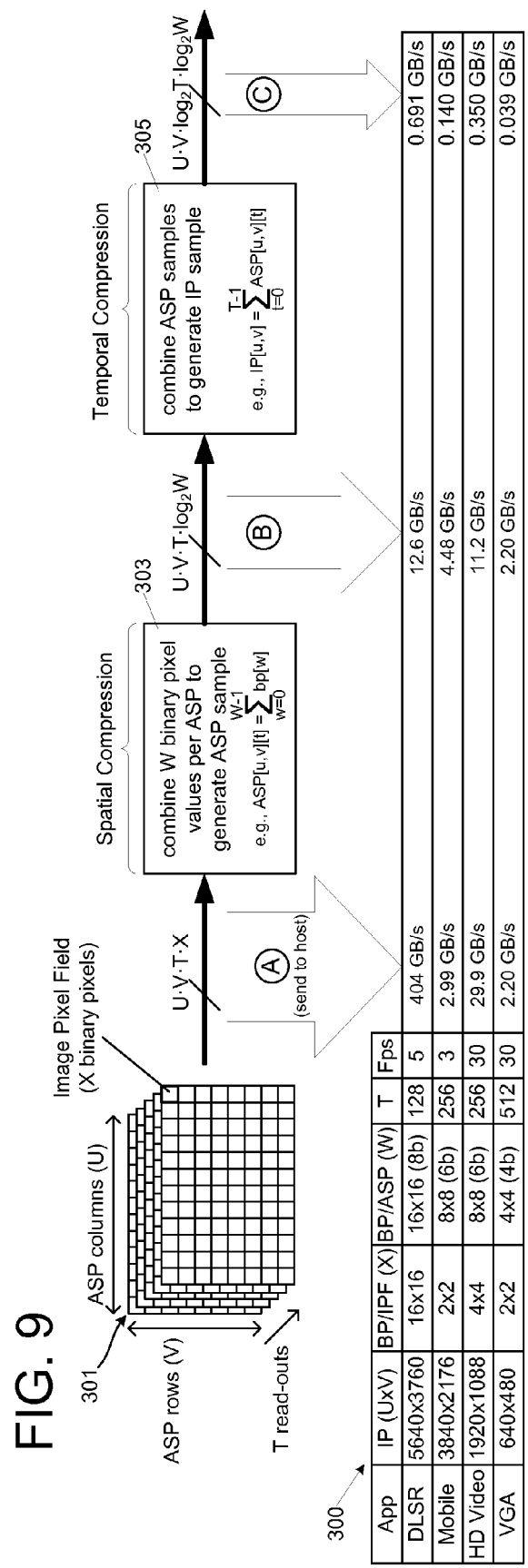
FIG. 9 illustrates exemplary data rates for selected imaging applications, together with compressed data rates that can be achieved by performing spatial and temporal compression operations within an image sensor IC instead of exporting (i.e., transmitting to another IC) the raw data needed to perform those operations.

FIG. 9 illustrates exemplary data rates for selected imaging applications, together with compressed data rates that can be achieved by performing spatial and temporal compression operations within an image sensor IC instead of exporting (i.e., transmitting to another IC) the raw data needed to perform those operations. As shown at 301, the quantum of binary pixel data for a given image can be expressed as U*V*T*X, where '*' denotes multiplication and U and V are the numbers of columns and rows of image pixels, respectively (and thus the numbers of columns and rows of ASPs), X is the number of binary pixels per image pixel field (i.e., the number of binary pixels per ASP (W), divided by the product of the vertical and horizontal pitch of the ASP), and T is the temporal oversampling factor or number of read-outs. Assuming that the binary-pixel data is to be transmitted by the image sensor IC without compression, the peak signaling rate can be calculated by multiplying size of the binary pixel data volume by the number of image frames to be generated per second ("Fps"). The table at 300 presents exemplary values for the U, V, T, X and Fps parameters for a selected set of imaging applications. More specifically, for the exemplary DLSR, mobile-phone camera, high-definition (HD) video and video graphics adapter (VGA) image parameters shown, the data rate calculation yields signaling bandwidth requirements of 404 GB/s (gigabytes per second), 2.99 GB/s, 29.9 GB/s and 2.20 GB/s, respectively. Considering the DLSR example in particular, while the nearly half-terabyte per second raw data bandwidth is not infeasible, it does represent a significant overhead in terms of I/O circuitry and power consumption. Similarly, even though the signaling bandwidth requirements of the mobile and HD video imaging systems are more modest, those signaling bandwidths still represent a substantial die area and power overhead.

In a number of embodiments, on-chip spatial compression circuitry is provided to reduce the signaling bandwidth requirement of a binary-pixel image sensor IC. As shown in FIG. 9 at 303, for example, by generating ASP samples on chip and transmitting the ASP values in place of raw binary pixel data, bandwidth requirements can be lowered dramatically, particularly in applications that having image pixel fields larger than 2×2 binary pixels. In the exemplary imaging applications shown in table 300, the W binary pixels encompassed by each ASP are combined in accordance with the spatial oversampling operation described in reference to FIG. 8 (e.g., weighted or non-weighted summation) to yield U*V ASP samples (one per image pixel) each of which can be represented by $\log_2$ W bits. Thus, within the DLSR example shown in table 300, the values of the 256 binary pixels spanned by each ASP (i.e., W=256) can be counted to form an 8-bit ASP sample value (i.e., value ranging from 0 to 255) with the 8-bit sample value being transmitted in place of the constituent pixel values of the image pixel field. The resulting data compression factor (256:8 or 32:1) in the DLSR example lowers the net bandwidth requirement from 404 GB/s to a much more manageable 12.6 GB/s. The data compression factor achieved within the HD Video camera example (16:6) is more modest due to the smaller image pixel field but still reduces the net signaling bandwidth by more than 50% from nearly 30 GB/s to 11.2 GB/s. In the VGA example, the spatial compression operation yields no net data compression as the image pixel field size matches the ASP sample size (i.e., four binary pixels and thus four bits). In the mobile-phone camera example, the spatial compression operation actually increases the volume of image data to be transmitted by 50%, as the six-bit ASP sample size is 50% larger than the four-bit image pixel field. Despite the lack of data compression (or even data expansion) in the mobile and VGA applications, it may still be beneficial to perform data compression on the image-sensor IC as the resulting signaling bandwidths remain well within the capabilities of modest signaling interfaces and the on-chip compression lowers the image processing burden of downstream components.

Continuing with FIG. 9, on-chip temporal compression circuitry can also (or alternatively) be provided to reduce signaling bandwidth requirements. As shown at 305, for example, such circuitry can combine a sequence of ASP samples obtained in respective read-out operations to form a corresponding image pixel sample, thus yielding a data compression factor of T:$\log_2$ T, where 'T' is the oversampling factor. The signaling bandwidth reduction that results from transmission of the image pixel samples in place of their constituent ASP samples thus varies according to the oversampling factor applied in a given application, but is more than 10:1 for each of the imaging applications shown in table 300.

Reflecting on FIG. 9 and the relative bandwidth requirements for the exemplary imaging applications shown at different points along the compression path (i.e., without compression at point A, after spatial compression at point B, or after spatial and temporal compression at point C), it can be seen that different data interface points (A, B or C) can be selected in accordance with the imaging application and the signaling bandwidth available. For example, despite the seemingly exorbitant signaling bandwidth required to output raw binary pixel data in the DSLR example shown (i.e., 404 GB/s), such signaling bandwidths can be readily achievable in three-dimensional IC applications in which an image sensor die is interconnected to a host IC die by way of a TSV array (offering hundreds or even thousands of data interconnects instead of the relatively narrow signaling interfaces detailed above). Conversely, in a mobile-phone camera application, despite the manageable bandwidth at interface point A (raw binary pixel export), it may be desirable to perform as much image processing on the image sensor die as possible to unburden the host IC.

In addition to the relatively static bandwidth considerations discussed above, there may be dynamic factors that favor selection of one data transmission strategy over another at different times or in different operating modes within an imaging application (e.g., enabling different post-processing of raw image data in certain operating modes). Accordingly, in one embodiment, the control logic of the image sensor IC (e.g., element 153 of FIG. 3) includes a programmable register or other configuration circuit that enables spatial and/or temporal compression circuitry in the data output path (e.g., within the multiplexing circuitry of FIG. 3) to be either bypassed or engaged, thereby enabling the image sensor IC to be operated in different data output modes (e.g., transmitting data at any of interface points A, B or C within the compression path shown in FIG. 9) within a given imaging application and/or to allow a general-purpose image sensor IC to be tailored during run-time or production-time for operation within one of various different imaging applications.

Noise Considerations and Sampling Thresholds

In embodiments discussed thus far, the value of an image pixel within a completed image frame is determined by oversampling with respect to a binary threshold both in space (breaking up the image pixel field into a large number of SDL pixels) and in time (sensing and reading out each SDL pixel multiple times per image frame) and then mathematically reconstructing the incoming photon flux. That is, instead of using a multi-bit ADC to digitize an analog value as in conventional image sensors, the photo-generated charge in each binary pixel is compared to a sampling threshold, the output of the binary pixel being '0' if the charge is below the threshold and '1' if it is above.

Analysis shows that the dynamic range of a sensor populated by such binary pixels can be made arbitrarily large with a logarithmic response to light intensity, limited only by the amount of oversampling. Unfortunately, the signal-to-noise ratio (SNR) drops off rapidly for sampling thresholds above single-photon sensitivity—a difficult threshold to implement within a practical image sensor.

Figure 10:
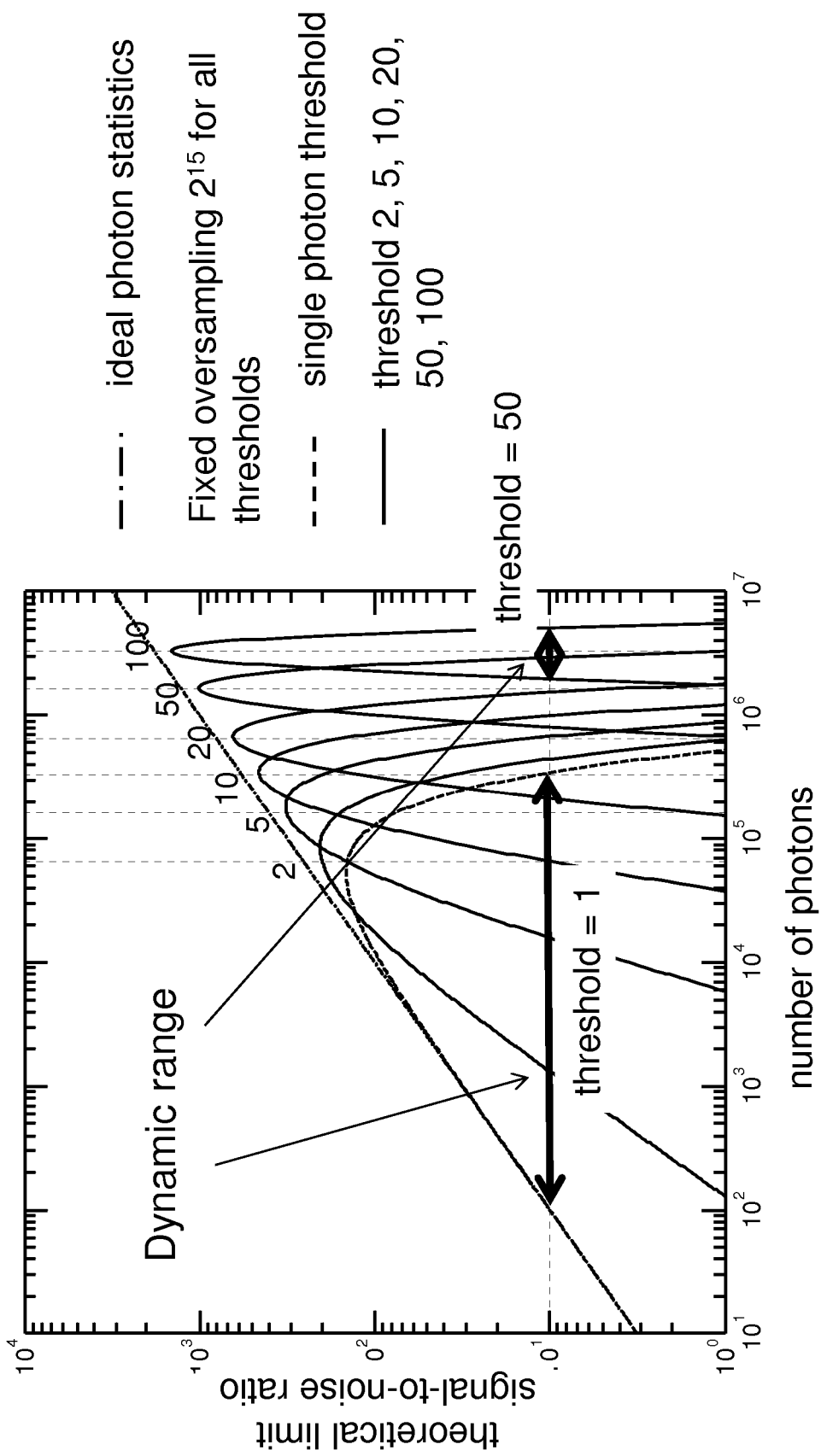
FIG. 10 is an exemplary log-log plot of signal-to-noise verses photon flux showing theoretical dynamic ranges for different binary thresholds.

Calculating the SNR as defined by the Cramer-Rao lower bound (CRLB) for different sampling thresholds other than single-photon shows that the limitation is not that the SNR is generally too low at all photon fluxes, but that the useable dynamic range of photon fluxes becomes narrower and narrower and the lower end of the useable dynamic range becomes unacceptably high with increasing threshold. This loss of dynamic range and low-light sensitivity is illustrated in FIG. 10 where the solid curves show the theoretically optimum SNR for sampling thresholds of 2, 5, 10, 20, 50 and 100 photons respectively and the dashed curve shows the single-photon threshold (the linear ceiling corresponds to ideal photon statistics). The curves for all sampling thresholds are calculated for an oversampling of $2^{15}$ in the example shown.

Figure 11:
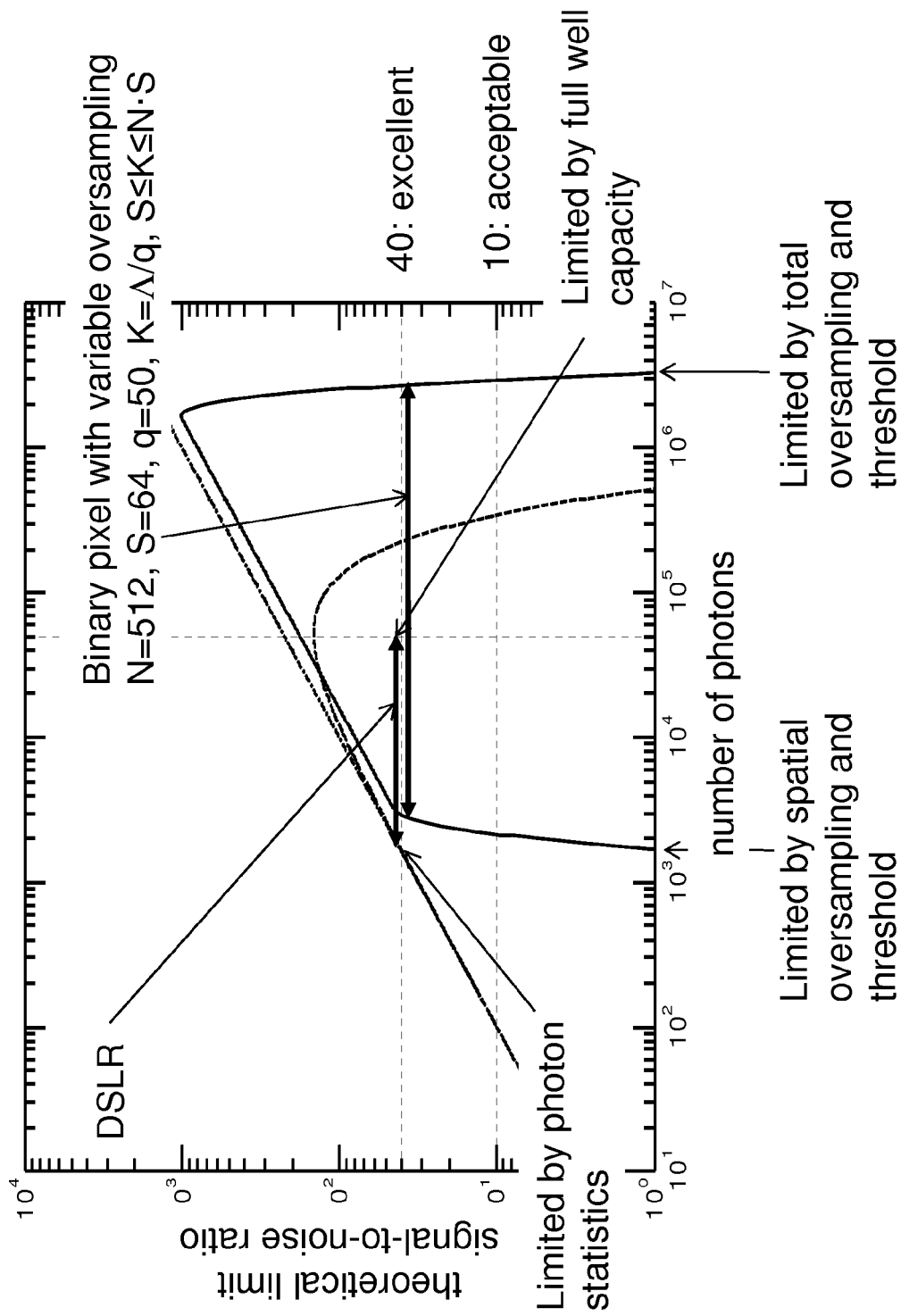
FIG. 11 is an exemplary log-log plot of signal-to-noise verses photon flux showing theoretical dynamic range achieved by dynamically varying the temporal oversampling factor.

It is recognized herein that according to FIG. 10, if each binary pixel could always be sampled at the optimum temporal sampling rate for any given combination of light intensity and sampling threshold (e.g., such that at each sample time there was a 50% chance the pixel registers a '1'), an excellent SNR could be achieved, even for high threshold values. The result of such an approach is shown in FIG. 11 where the total oversampling, K, is set to $\Lambda/q$ as long as the condition $S \leq \Lambda/q \leq N*S$ is fulfilled, where '$\Lambda$' is the number of photons impacting an ASP over the total image frame exposure interval), 'q' is the sampling threshold of a binary pixel expressed as a number of photons, 'N' is the number of temporal samples and thus the temporal oversampling factor and 'S' is the number of pixels per ASP and thus the spatial oversampling factor. For very low light intensities no temporal oversampling is used ($K_{low}$=S), while for very high light intensities the maximum possible oversampling is applied ($K_{high}$=N*S). As shown, the result is a high SNR and a large dynamic range. As discussed below, a technique referred to herein as variable temporal oversampling is employed to build an image sensor that approaches the maximum SNR as defined by this CRLB. Since the lower limit is defined by the spatial oversampling, the dynamic range will be larger for a given total oversampling if there is more temporal and less spatial oversampling.

Variable Temporal Oversampling

The above discussions of binary pixel image sensors have assumed that a precharged binary pixel is discharged in response to photon strikes over a exposure interval defined as the image frame exposure time divided by the temporal oversampling factor. The resulting charge level is then compared to the sampling threshold and the binary pixel is reset (i.e., precharged). This means that all photons which reach a binary pixel but do not add up to a number above the threshold are lost, the intuitive reason for the narrow dynamic range of higher thresholds in FIG. 10. In alternative embodiments, loss of these photons is avoided by sampling all binary pixels at a high temporal sampling rate, but resetting each binary pixel only when the threshold has been surpassed. Applying this approach, the number of exposure intervals over which a given photon count is accumulated is dependent on the photon flux itself, effectively lowering or raising the oversampling of each binary pixel according to the light intensity it perceives and thus effecting a variable temporal oversampling. At very high light intensities there will be enough photons to trigger pixel reset nearly every sampling interval, so the response will approximate that of the sensor with pixel reset after every sampling interval (i.e., maximum oversampling). Conversely, at low light intensities, pixel reset will occur less frequently (i.e., only after multiple sampling intervals have transpired) thus effecting reduced oversampling.

Figure 12:
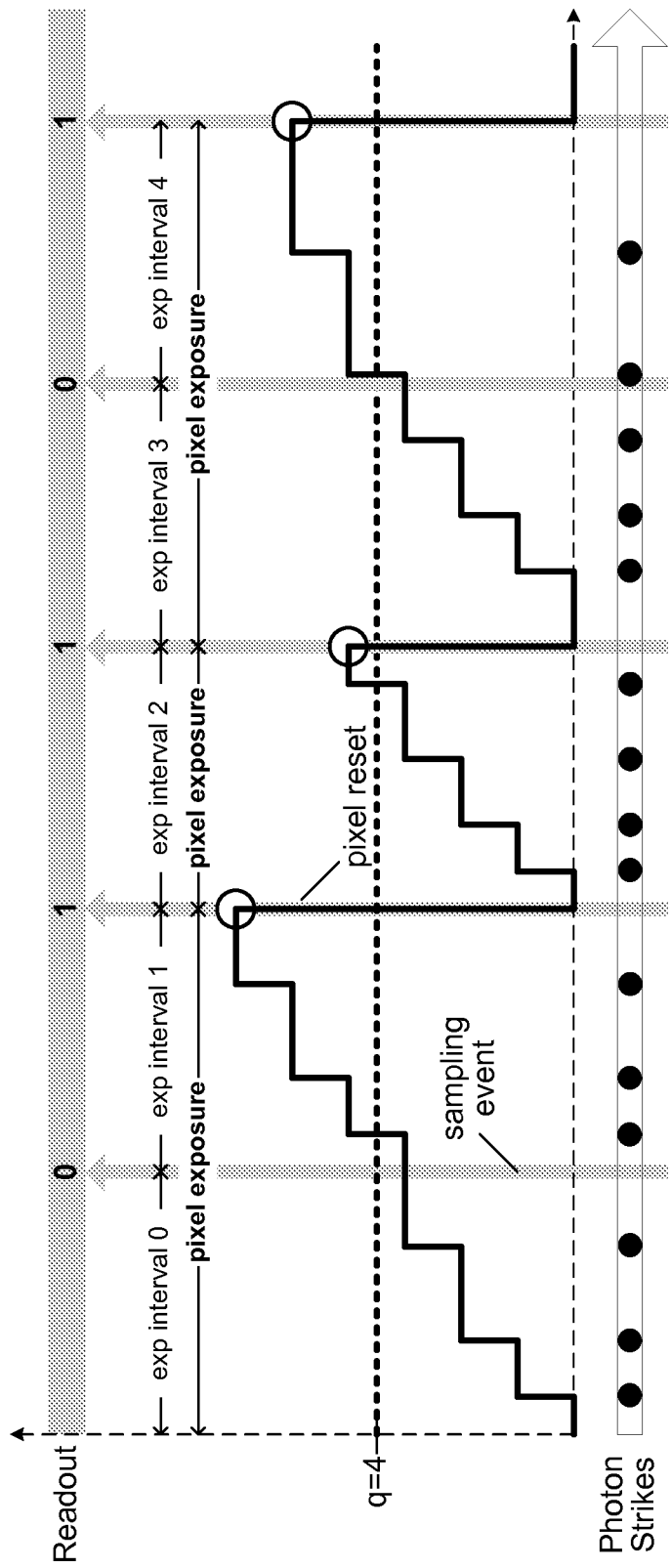
FIG. 12 illustrates an example of variable temporal oversampling of a binary pixel having a sampling threshold corresponding to four photons.

FIG. 12 illustrates an example of variable temporal oversampling of a binary pixel having a sampling threshold ('q') corresponding to four photons. Photons strike the binary pixel randomly over the five exposure intervals shown (e.g., established by a sampling clock signal) triggering corresponding pixel voltage transitions, shown as positive steps in the pixel state for purposes of example. Because the binary pixel is reset only in response to sampling events that yield cumulative photon strikes above the threshold, photon strikes are effectively counted over a varying number of exposure intervals, thus yielding a varying time between binary pixel reset events. For example, the binary pixel voltage corresponding to the first three photon strikes does not exceed the four-photon count threshold, so that no pixel reset occurs during the sampling event that concludes exposure interval 0 ("exp interval 0"). Instead, those three photon strikes remain reflected in the binary pixel voltage at the start of exposure interval 1, in effect, carrying the pixel count over from exposure interval 0 to exposure interval 1 and thereby extending the effective exposure interval of the binary pixel over a combination of the two clocked exposure intervals shown. Thus, the three additional photon strikes during exposure interval 1 combine with the three strikes from exposure interval 0 to produce a logic '1' readout and a pixel reset at the end of exposure interval 1. Photon strikes occur more frequently during exposure interval 2, exceeding the threshold and thus triggering a reset (and a logic '1' readout) at the conclusion of that interval. The photon flux slows in exposure interval 3 so that no pixel reset occurs at the conclusion of that interval and the photon count instead is carried over to exposure interval 4, yielding a logic '1' readout and pixel reset at the conclusion of that interval. Reflecting on the operation shown, it can be seen that the effective exposure interval varies in duration according to the photon flux, extending from a minimum time corresponding to a single clocked exposure interval to a maximum time corresponding to the total number of clocked exposure intervals per image frame period (i.e., T clocked exposure intervals). Because the number of binary pixel exposure intervals determines the degree of temporal oversampling within a given image frame period, the variable effective exposure interval yields a correspondingly variable temporal oversampling. Viewed in the context of FIG. 10, the effective threshold at which the binary pixel yields a logic '1' sample varies according to the photon flux, tracking the photon flux to establish a threshold within a corresponding one of the threshold curves shown and thus a net SNR profile as shown in FIG. 11; limited at a lower photon flux by the spatial oversampling factor and minimum practicable sampling threshold, and at an upper photon flux by the total oversampling factor (i.e., the variable temporal oversampling and the spatial oversampling) and the sampling threshold. A Monte Carlo simulation applying modest oversampling (i.e., $2^9$ temporal oversampling and $2^6$ spatial oversampling) and a sampling threshold corresponding to 50 photons yields a good to excellent SNR—at least above 10:1 and over predominantly over 40:1—over a photon flux range that approximately matches the theoretical dynamic range shown in FIG. 11.

Figure 13:
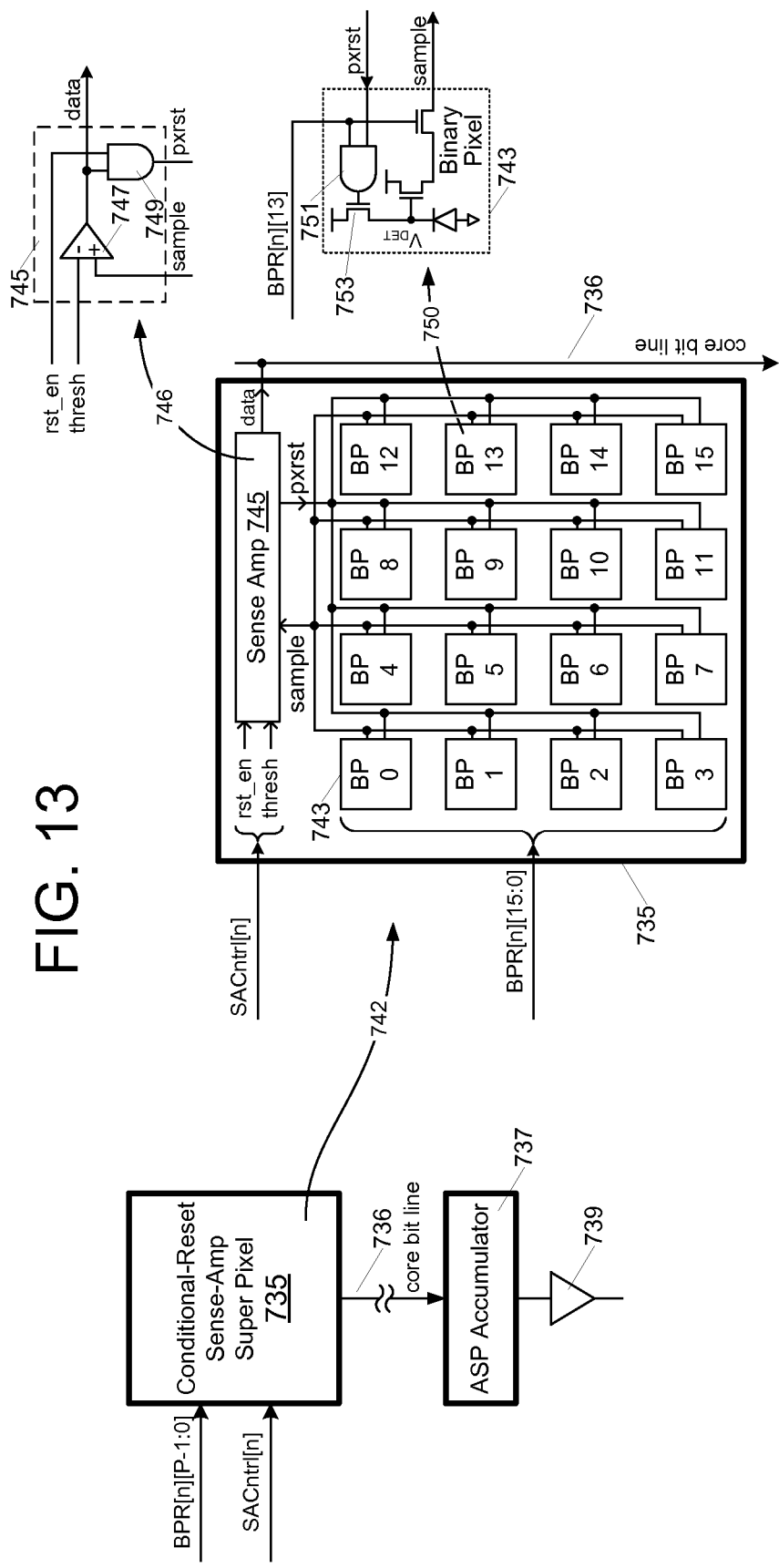
FIG. 13 illustrates an embodiment of a sense-amp super pixel having conditional (over-threshold) pixel reset logic that enables the variable temporal oversampling described in reference to FIG. 12.

FIG. 13 illustrates an embodiment of a sense-amp super pixel 735 having conditional (over-threshold) pixel reset logic that enables the variable temporal oversampling described above. The conditional-reset SSP 735 may be deployed within any of the binary pixel image sensors described above and thus receives binary pixel row signals (BPR[n][P−1:0]) and sense amp control signals (SACntrl[n]) corresponding to an 'nth" SSP row within the image sensor and, when enabled, outputs pixel data onto a core bit line 736 to be counted within an ASP accumulator 737 and output via I/O circuit 739. In the exemplary embodiment shown in detail view 742, conditional-reset SSP 735 includes an embedded sense amplifier 745 coupled to sixteen binary pixels through one or more local bit lines (shown as a "sample" line) and one or more pixel reset lines ("pxrst"). Though shown at the margin of SSP 735, sense amplifier 745 may alternatively be distributed among binary pixels 743 (e.g., consuming pixel cells as discussed above). As in all embodiments, more or fewer binary pixels 743 may be present than those shown.

The sense amp control signals (SACntrl) provided to embedded sense amplifier 745 include, in addition to other signals discussed below, a digital or analog threshold signal ("thresh") and a reset-enable signal ("rst_en"). The threshold and reset-enable signals are applied within the sense amplifier as shown conceptually at 746. That is, comparator circuitry 747 compares the threshold with a binary pixel value driven onto the sample line (i.e., by a binary pixel selected by assertion of a corresponding BPR signal) to produce a pixel data signal ("data") which, in turn, is ANDed with the reset-enable signal in logic 749 to drive the pixel reset line. By this operation, a reset signal is asserted on the pixel reset line to reset the selected binary pixel only if that binary pixel has received sufficient light to yield an over-threshold binary pixel value. Because the conditional pixel reset events are synchronized by the timing of the reset-enable signal (itself asserted, for example, at regular intervals within a sequence of pixel cycles), the effective exposure interval for a given binary pixel is established at a predetermined number of clocked exposure intervals as shown in FIG. 12.

Still referring to FIG. 13 and more specifically to detail view 750 of a binary pixel 743, the pixel reset line is coupled to pixel reset logic 751 where it is logically ANDed with a pixel-specific control signal (e.g., the binary pixel row signal for the subject pixel, though a different control signal may alternatively be used) to selectively switch on reset transistor 753 and thereby couple the detection node of the pixel ("$V_{DET}$") to a precharge voltage source. Accordingly, when the pixel reset signal is asserted by the sense amplifier (i.e., in response to a binary pixel value that exceeds the sampling threshold), and the pixel-specific control signal is also asserted, the binary pixel is reset. Through this operation, each of the binary pixels within conditional-reset SSP 735 may be reset at different times and thus accumulate light without reset over disparate numbers of clocked exposure intervals in accordance with their respective photon absorptions.

FIGS. 14A-14C illustrate embodiments of conditional-reset sense amplifiers and corresponding binary pixels that may be employed to achieve variable temporal oversampling within a binary pixel image sensor. FIG. 14A illustrates a current-mode sense amplifier 770 that operates generally as described in reference to FIG. 5 (with the local bit lines re-labeled as "sample" and "crsc") to yield an output data value according to whether the charge level on the detection node of an attached binary pixel 785 (i.e., the "binary pixel value") is above or below a sampling threshold. In a departure from the embodiment of FIG. 5, sense amplifier 770 additionally includes conditional-reset circuitry to assert an active-low pixel-reset signal if the binary pixel value exceeds (i.e., detection node voltage is lower than) the sampling threshold, thus enabling a conditional reset operation within the attached pixel. More specifically, the data output of the sense amplifier and a reset-enable signal (rst_en) are supplied to a logic NAND circuit formed by transistors 778, 779, 780 and 781, switching on transistors 778 and 779 and switching off transistors 780 and 781 to pull the pixel reset line low if the sense amp data output (generated by inverter transistors 776 and 777) and reset-enable signals are both high. Conversely, the NAND circuit pulls the pixel reset line high (to a deasserted state) via transistor 781 or 780 (and switching off at least one of transistors 778 and 779) if either of the data output or the reset-enable signal are low.

Within binary pixel 785, the active-low state of the pixel reset line switches on logic AND transistor 791, thereby passing the state of the binary pixel row signal to the gate of reset transistor 787. Accordingly, reset transistor 787 is switched on to reset (i.e., precharge) the binary pixel when the pixel-reset line is pulled low and the binary pixel row signal is asserted. Altogether, when the binary pixel row signal is raised to enable the binary pixel value to be sampled (i.e., enabling the charge level of the detection node onto the sample line) and the binary pixel value exceeds the sampling threshold such that a logic '1' is generated at the sense amp data output, then a concurrent assertion of the reset-enable signal will, in conjunction with the over-threshold binary pixel value, pull the pixel-reset line low to effect a pixel reset operation within the binary pixel selected by the asserted binary pixel row signal. When the pixel reset signal is high, pull-down transistor 790 is switched on within binary pixel 785 to ground the gate of reset transistor 787 and thus prevent reset regardless of the state of the binary pixel row signal.

As noted above, the reset-enable signal and threshold value constitute a subset of the sense-amp control signals provided to the sense amplifier within a given sense-amp super pixel. In the embodiment of FIG. 14A, the sense-amp control signals additionally include a clamp signal that is asserted between pixel sampling events to switch on transistor 775, coupling the output node of the differential amplifier (i.e., drain of transistor 771) to ground and thus avoiding a floating input to the inverter formed by transistors 776 and 777 (preventing, among other things, a metastable output on the data line). The bias signal is applied to the gate of current-sinking transistor 772 to effect a desired amplification level within the sense amplifier. In one embodiment, the bias signal is an analog voltage generated, for example, by a current mirror or other bias-control circuit to establish (in conjunction with current-mirror coupled load transistors 773, 774) a desired bias current within the differential amplifier. In an alternative embodiment, the bias signal is a multi-bit digital signal that is applied to a bank of parallel transistors (represented symbolically by transistor 772) so that, as the number of logic '1' bits within the bias signal is increased or decreased, a corresponding number of transistors within the parallel bank are switched on to establish a corresponding bias current. In either implementation, calibration operations may be performed at system startup and/or occasionally thereafter to establish/maintain an appropriate bias signal setting.

FIG. 14B illustrates an alternative embodiment of a conditional-pixel-reset sense amplifier 795 and conditionally-resettable binary pixel 805. Sense amplifier 795 works similarly to the sense amplifier of FIG. 14A, except that transistors 796, 797, 798 and 799 are provided to logically AND an active-low reset-enable signal (/rst_en) and the complement data signal output from the differential amplifier pair (i.e., from the drain of transistor 771). That is, when the reset-enable signal is lowered, transistor 799 is switched on to power the inverter formed by transistors 796 and 798. Consequently, when the complement data signal is low (i.e., the binary pixel output exceeds the sampling threshold), the inverter output goes high (i.e., transistor 798 is switched on, while transistors 796 and 797 are switched off), thereby driving the pixel reset line high to effect a pixel reset.

In contrast to the embodiment of FIG. 14A, the pixel reset logic within binary pixel 805 is formed by only two transistors (not three), but is controlled by a pixel-row reset signal (BPR_reset) that is distinct from the binary pixel row signal used to enable the detection node voltage to be sensed (i.e., "BBR_sense" in the embodiment shown). More specifically, the AND transistor 791 and pull-down transistor 790 shown in FIG. 14A are omitted in favor of an additional reset transistor 806 coupled between sense-amp-controlled reset transistor 807 (which corresponds to transistor 787 in the embodiment of FIG. 14A) and the detection node. The two reset transistors 806, 807 are coupled to the pixel-row reset input (BPR_reset) and the pixel reset line (pxrst), respectively, so that, when both inputs are high, the detection node of the binary pixel is switchably coupled to a precharge voltage source (e.g., VDD) to reset the binary pixel.

Still referring to FIG. 14B, in an alternative embodiment a single binary pixel row signal may be supplied to the gates of access transistor 130 and reset transistor 806, provided that any charge trapped in the source-to-drain coupling between the two reset transistors 806 and 807 (i.e., trapped by virtue of pixel reset signal assertion in connection with other binary pixels of the SSP) does not intolerably disturb the pixel sampling result.

FIG. 14C illustrates another alternative embodiment of a conditional-pixel-reset sense amplifier 815 and conditionally-resettable binary pixel 820. In this case, the sense amplifier works as a voltage mode amplifier instead of a current mode amplifier by virtue of local amplifying transistor 816. Because the differential amplifier sensing current passes through amplifying transistor 816 instead of transistor 132 within binary pixel 820, transistor 132 may be tied high as shown and thus operated as a follower amplifier (providing an output to the gate of amplifying transistor 816 via access transistor 130) that follows the state of the detection node. While a follower amplifier is shown, in all such in-pixel amplifying arrangements, the gain of the amplifying transistor or amplifying circuit may be greater than, less than or equal to one. Also, while the conditional pixel reset circuitry within the binary pixel and sense amplifier corresponds to that shown in FIG. 14A, the approaches described in reference to FIG. 14B can be employed in alternative embodiments.

Figure 15:
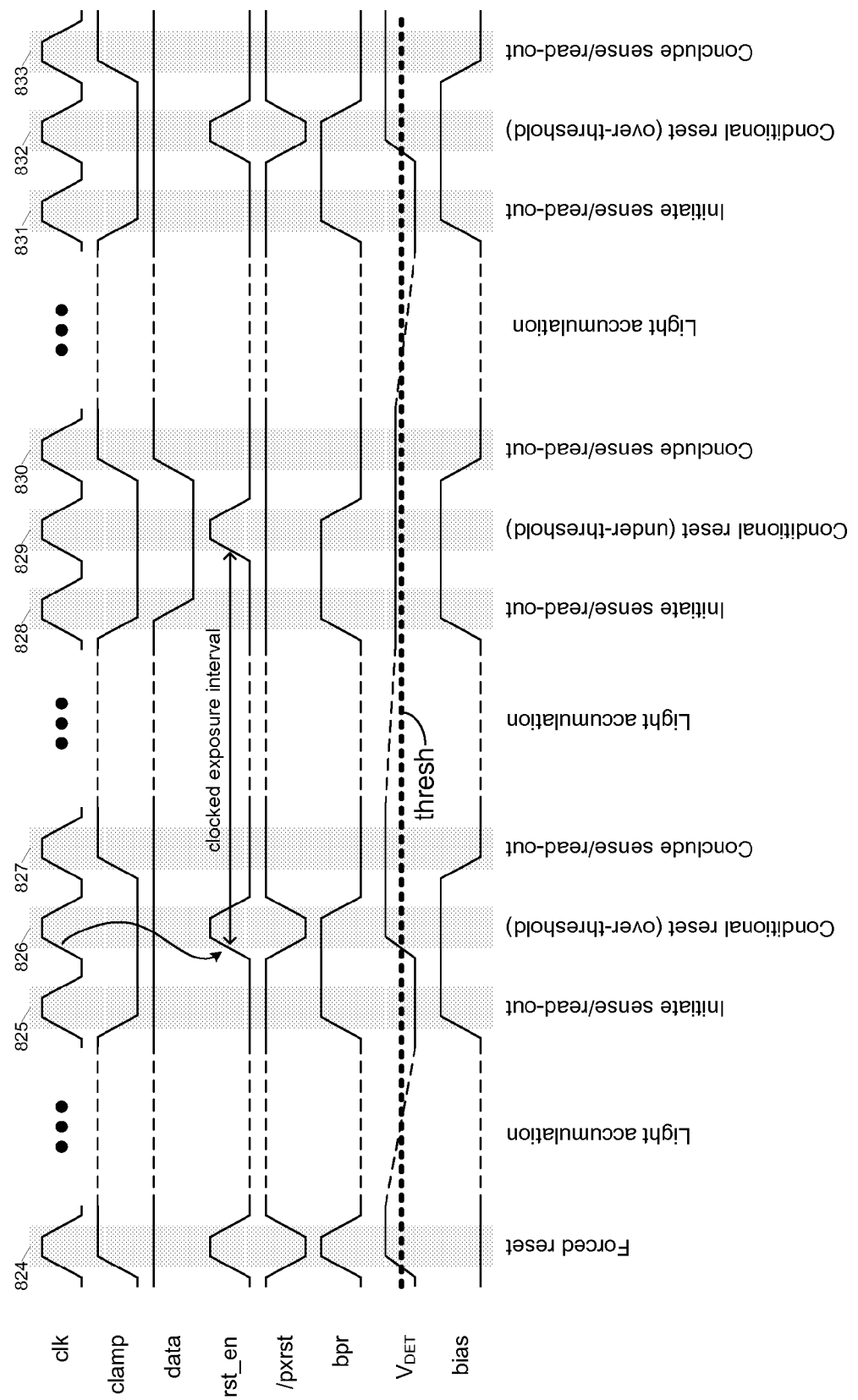
FIG. 15 is a timing diagram illustrating an exemplary operation of a sense-amp super pixel that includes the conditional-reset sense amplifier and binary pixel of FIG. 14A.

FIG. 15 is a timing diagram illustrating an exemplary operation of an SSP that includes the conditional-reset sense amplifier and binary pixel of FIG. 14A. Operations within the SSP are executed synchronously with respect to a clock signal (clk) and are shown as a sequence of shaded events (824-833) in respective clock cycles. Initially, at 824, a forced reset is executed with respect to the binary pixel by asserting (raising) the clamp, reset (rst_en) and binary pixel row signals while deasserting the bias signal, thus forcing a low output from the differential amplifier to emulate an over-threshold condition and trigger a pixel reset. That is, referring briefly to FIG. 14A, the high data output of inverter 776/777 is NANDed with the reset-enable signal to drive the pixel-reset line low, which, in combination with the asserted binary pixel row (bpr) signal, produces a high signal at the gate of the reset transistor 787 to reset the binary pixel (charge or pre-charge the detection node).

Following the pixel reset at 824, the binary pixel is exposed over a light accumulation interval. Note that the light accumulation interval may span many clock cycles as explained above and thus the detection node voltage is shown as having a steady declining slope—in actuality, the detection node voltage will decrease stepwise in response to non-uniformly spaced photon strikes. At 825, the clamp signal is lowered while the bias and binary pixel row signals are raised, thereby initiating a pixel sense/read-out operation. Because the detection node voltage has dropped to a level below the threshold voltage (shown as a steady-state signal level superimposed over the detection node voltage), the differential amplifier generates a logic low output that is inverted to form a logic '1' binary pixel sample. In the embodiment shown, the binary pixel sample is output ("data") onto a core bit line (i.e., to be counted by an on-chip or off-chip ASP accumulator) over a pair of clock cycles before the bias and binary pixel row signals are lowered (and the clamp signal raised) to conclude the sense/read-out operation at 827. In the second clock cycle of the read-out interval, after the binary pixel sample value has stabilized at the sense amp data output, a conditional reset operation is executed as shown at 826. More specifically, the reset signal is raised in response to the rising clock edge as shown, thus causing the NAND gate formed by transistors 778, 779, 780, 781 in FIG. 14A to assert or deassert an active-low pixel reset signal (driving the pixel reset line low or high, respectively) according to whether an over-threshold condition was detected with respect to the subject binary pixel. Accordingly, the logic '1' (over-threshold) binary pixel sample in the example shown triggers assertion of the active-low pixel reset signal, which, in combination with the continued assertion of the binary pixel row signal, effects a pixel reset.

The sense/read-out and conditional-reset operations are repeated at 828, 829 and 830 following a second light accumulation interval, but a lesser light accumulation yields an under-threshold detection node voltage (i.e., a detection node voltage that does not exceed—that is, go lower than—the threshold level). Consequently, the resulting logic '0' binary pixel sample yields a logic high (unasserted) pixel reset signal and thus no pixel reset occurs. Accordingly, at the conclusion of the sense/read-out at interval 830, the binary pixel is again allowed to accumulate light over an exposure interval, with the partially discharged detection node voltage produced in the preceding exposure interval being carried forward as the initial condition for the subsequent exposure interval. Consequently, even though the lower photon flux (i.e., lower than in the exposure preceding the sense operation at 825) continues, the non-reset during conditional reset interval 829 effectively joins the two clocked exposure intervals (i.e., the exposure interval between 827 and 828, and the exposure interval between 830 and 831) into a single effective exposure interval such that the detection node voltage at the subsequent sense/read-out interval 831 reflects the total number of photon strikes during those two clocked exposure intervals. In the example shown, the photon count over the last two clocked exposure intervals is sufficient to exceed the threshold and thus yields a logic '1' data output that contributes to the net ASP value and produces the pixel reset shown at 832. Though a photon accumulation without reset over two exposure intervals is shown, lower levels of photon flux may result in continuous photon accumulation over any number of clocked exposure intervals between one and the total image frame interval (or other maximum) before a forced reset is executed.

Non-Uniform Sampling Thresholds

Mathematical analysis and simulation results indicate the potential for undesired monotonicity in the response curve of a variable temporal oversampling image sensor at low luminance due to the quantized nature of the temporal oversampling. In a number of embodiments, those errors and resulting output anomalies are mitigated or avoided altogether by effecting non-uniform sampling thresholds within the sensor. In a first set of non-uniform threshold embodiments, for example, different reference voltages are applied to respective binary pixels that contribute to a single image pixel to effect a spatial distribution of non-uniform thresholds. That is, each of the pixels is sampled with respect to a given reference voltage (threshold voltage) and thus yields a single-bit digital sample, but the reference voltage applied in at least one of the binary pixels differs substantially from the reference voltage applied in at least one other of the binary pixels during a given exposure interval, so that a range of reference voltages is applied to respective binary pixels. In another set of non-uniform threshold embodiments, binary pixels of varying sizes (i.e., exhibiting non-uniform light accumulation areas) are provided within each image pixel field to effect a spatial-distribution of non-uniform thresholds with a single reference voltage, thus avoiding the complexities and potential errors involved with generating multiple reference voltages. In yet another set of non-uniform threshold embodiments, different reference voltages are applied sequentially to the binary pixels of the image sensor in respective portions of the image frame period to effect a temporal rather than a spatial distribution of thresholds, thereby achieving the benefits of multiple reference voltages without the added wiring and in-situ reference selection circuitry required for spatial distribution of the reference voltages. Instead of or in conjunction with any of the non-uniform threshold embodiments, non-uniform thresholds can also be effected by varying the reset voltage applied to one or more of the binary pixels, either spatially or temporally. By intentionally "under-precharging" a binary pixel to a voltage that is closer to the comparison reference, the threshold is effectively lowered because fewer photon strikes are required to discharge the pixel to a voltage below the reference voltage.

FIG. 16A illustrates an embodiment of a conditional-reset SSP 845 that applies multiple reference voltages to respective subsets of binary pixels to effect spatially-distributed, non-uniform thresholds. In general, multiple sampling thresholds between $q_{min}$ (≥single-photon charge dissipation) and $q_{max}$ are determined by expected incident luminances, spatial and temporal oversampling factors and physical constraints on VLSI design and manufacture and applied to respective groups of binary pixels 847 within the SSP and thus within an image sensor as a whole. In a number of embodiments, the threshold distribution is determined so as to optimize a luminance fidelity metric, (e.g., minimize the signal to noise weighted by the expected probability of finding a given luminance level). In at least one such determination, for instance, all other parameters being equal, the distribution is dominated by low-threshold values in low-luminance conditions and by high-threshold values in high-luminance conditions. Once the number of binary pixels associated with each threshold value, 'q', has been determined, the spatial arrangement of all the binary pixels may be determined so as reduce spatial artifacts in the final rendered image, in particular to reduce aliasing artifacts. In one embodiment, for example, the spatial distribution of different-threshold binary pixels is chosen so as to minimize the peak of the two-dimensional Fourier transform of the image pixel sensitivity.

Figure 31:
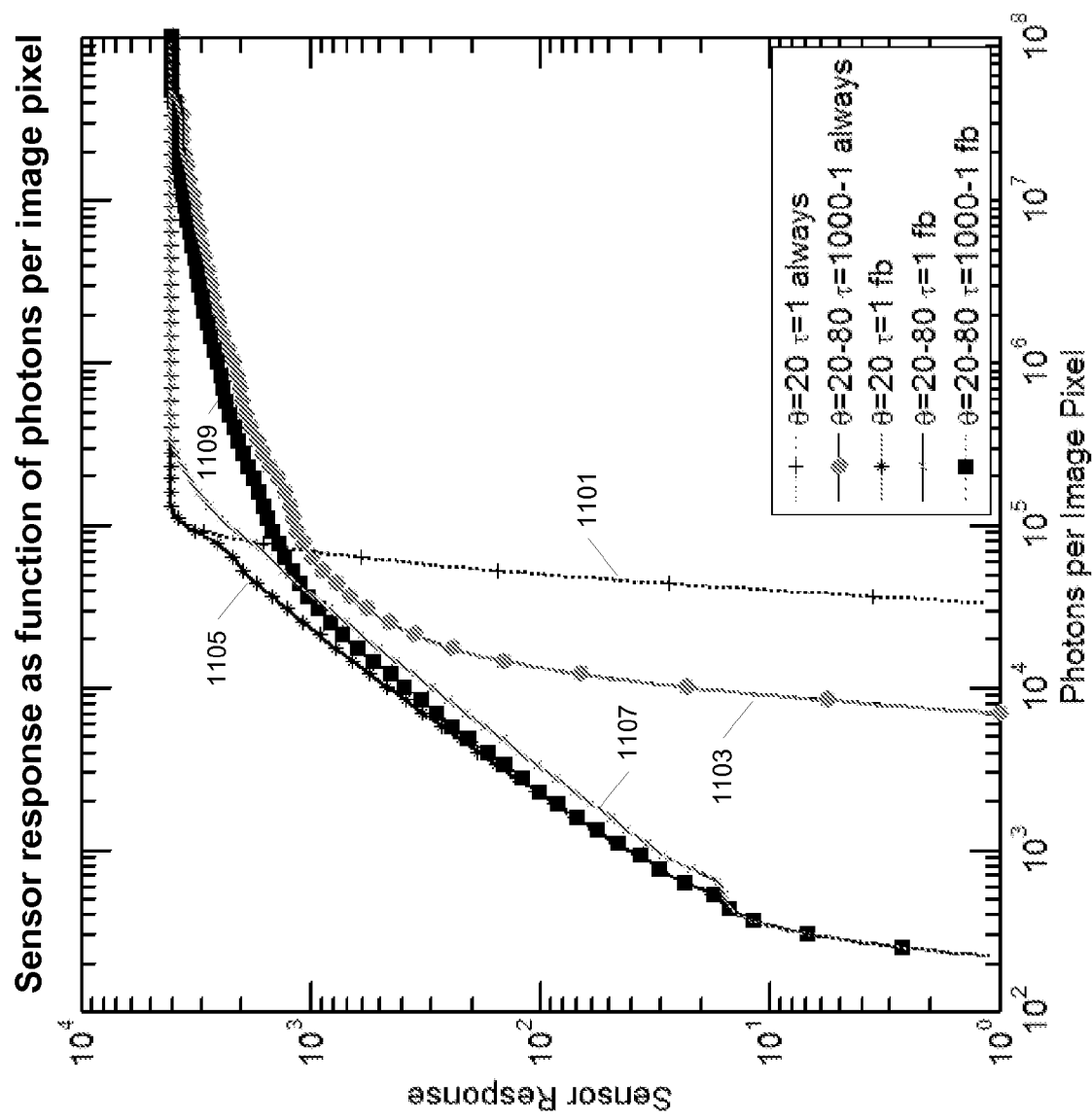
FIG. 31 shows an exemplary sensor response as function of photons per image pixel.

Still referring to FIG. 16A, SSP 845 operates generally as explained above in reference to FIG. 13, receiving a set of binary pixel row signals (BPR[n][15:0] in this example) and sense-amp control signals (SACntrl[n]), and executing conditional reset operations to effect variable temporal oversampling. Instead of receiving a single reference (threshold) voltage, however, the embedded sense amplifier 849 receives multiple reference voltages, depicted in detail view 850 as q0, q1, q2, q3 (or q[3:0]), and a select signal ("sel") that indicates which of the reference voltages is to be applied to establish the threshold for a given binary pixel sense/read-out operation. In the embodiment shown, sixteen binary pixels 847 are split into four threshold-groups with each of the four threshold groups being sensed in comparison to a respective one of the four thresholds, q0, q1, q2 or q3, as indicated within the label of the binary pixel. Further, the binary pixels 847 that constitute each of the four groups are spatially dispersed (or scattered) within the SSP such that each of the thresholds is applied to an expansive rather than a concentrated region within the SSP. In FIG. 31, for example, the footprint of each subgroup extends to upper, lower, right and left edges of the binary pixel area; a region that can be envisioned, for example, by a box outline that includes each of the shaded binary pixels to which threshold q0 is applied.

In one embodiment, illustrated by the exemplary SSP read-out sequence in FIG. 16B, the binary pixel pixels of SSP 845 are read-out in a sub-group order that yields a stepwise increase in the applied threshold. That is, the binary pixels of sub-group 0 (BP0-BP3) are read out in the first set of four pixel sense/read-out operations, while the threshold select value is set to select reference voltage q0 as the applied threshold ("applied thresh"), a selection effected by selector element 855 as shown within detail view 850 of sense amplifier 849. After the sense/read-out of the binary pixels of sub-group 0 (each of which includes a comparison with the selected q0 threshold in comparator circuitry 851 to yield a data value that is ANDed with a reset-enable signal in logic 853 to yield a conditional pixel reset signal) is completed, the binary pixels of sub-group 1 (i.e., BP4-BP7) are read out while reference voltage q1 is selected as the applied threshold, then the binary pixels of sub-group 2, and finally the binary pixels of sub-group 3. In alternative embodiments, the sub-groups may be sensed and read-out in an order reverse of that shown (i.e., ramping the applied threshold down from q3 to q0) or in a scattered order in which the threshold select signal transitions as frequently as the binary pixel row signal. As the application of a given threshold in a binary pixel sense/read-out operation defines the subject binary pixel as being part of the threshold subgroup, the various different subgroup read-out sequences may be used to establish a desired distribution of binary pixel sub-groups within the SSP; distributions that may be programmably determined (e.g., by one or more fields within a threshold policy register) and thus changed in accordance with application requirements or dynamically according to ambient or other conditions.

FIG. 17 illustrates an embodiment of a multi-thresholding, conditional-reset sense amplifier 865 that may be employed within the SSP of FIG. 16A. In general, sense amplifier 865 operates as discussed in reference to FIG. 14C or 30A except that input transistor 771 of those sense amplifiers is replaced (or supplemented) by multi-threshold circuitry 867 ("mt"). In one implementation, shown for example in detail view 870, multi-threshold circuitry 867 includes an input transistor 871 corresponding to transistor 771 of FIG. 14C/30A together with a multiplexer (formed by pass gates $873_0$-$873_3$) that applies one of the four incoming reference voltages (q[3:0] in this example) to the gate of input transistor 871 in accordance with the state of the threshold select signal, "sel." In alternative embodiments, single-transistor pass-gates (or other switching elements) may be used instead of the two-transistor pass gates shown, and more or fewer reference voltages may be provided.

Still referring to FIG. 17, an alternative embodiment of the multi-threshold reference circuitry includes parallel reference paths as shown in detail view 880. Each of the reference paths includes an input transistor (881*a*, 882*a*, 883*a* or 884*a*) coupled to receive a respective one of reference voltages q[0]-q[3] (again, there may be more or fewer reference voltages than the four shown), and an enable transistor (881*b*, 882*b*, 883*b* or 884*b*) coupled to receive a respective bit of the threshold select signal. By this arrangement, the threshold select signal may be output in one of four one-hot states (i.e., one bit set, the others cleared) to couple the input transistor of a selected one of the reference paths between transistors 774 and 772 of sense amplifier 865, thereby establishing the corresponding reference voltage as the applied threshold. Again, there may be more or fewer reference voltages (and corresponding reference paths) than the four shown. Also, an additional enable transistor may be disposed in series between transistors 773 and 772 of the sense amplifier and/or other loading element coupled to the drain terminal of bias transistor 772 for load matching purposes.

Figure 18A:
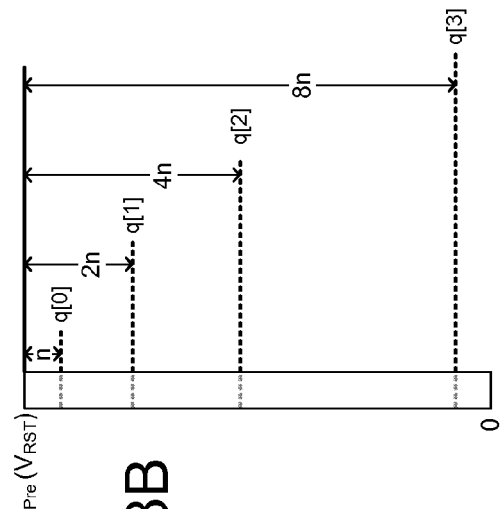
FIG. 18A illustrates an embodiment of a reference generator that may be used to generate the reference voltages supplied to the multi-threshold SSP of FIG. 16A and applied within the sense amplifier of FIG. 17.

FIG. 18A illustrates an embodiment of a reference generator 890 that may be used to generate the reference voltages supplied to the multi-threshold SSP of FIG. 16A and applied within the sense amplifier of FIG. 17. As shown, reference generator 890 includes a base register 891 to store a programmed or predetermined base reference value, "q-base," and a set of canonically coupled multipliers 893, 895, 897. The output of base register 891 and each multiplier 893, 895, 897 is supplied to a respective digital-to-analog converter (892, 894, 896, 898), thereby yielding a set of reference voltages having an amplitude $q[i]=q\text{-base}^{i*M}$, where i is the index of the reference voltage and M is the factor applied within each multiplier 893, 895, 897. In one embodiment, for example, M=2 so that each reference voltage is twice that of the nearest reference (and so that each multiplier may be implemented by a small-footprint shift arrangement that prepends a '0' bit in the least significant bit position of the incoming reference value to generate an output reference value). Other multiplication factors may be applied by the multipliers 893, 895, 897 in alternative embodiments, including non-uniform multiplication factors (e.g., applying $M_1$, $M_2$ and $M_3$, where $M_1 \neq M_2$ and/or $M_2 \neq M_3$). More generally, any number of reference voltages may be generated with any practicable voltage distribution, including distributions that are determined adaptively or heuristically instead of according to predetermined formulae. In all such cases, the reference voltages may be supplied to an adjuster circuit 899 that calibrates and/or adapts the reference voltages according to their differences or other source of information indicating a deviation from desired thresholds. Also, base register 891 may be loaded with an updated value in a register programming operation, or incremented/decremented as part of a calibration loop or adaptive loop (e.g., receiving an increment/decrement signal from adjuster 899) to shift all the reference voltages up or down.

Figure 18B:
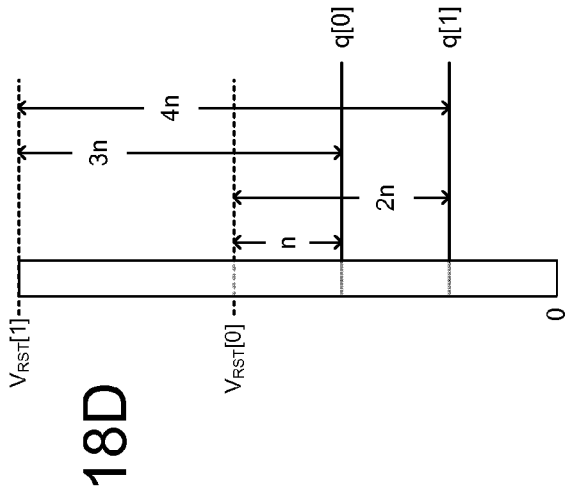
FIG. 18B illustrates an exemplary threshold profile that may be generated by the reference voltage generator of FIG. 18A or a variation thereof.
Figure 18C:
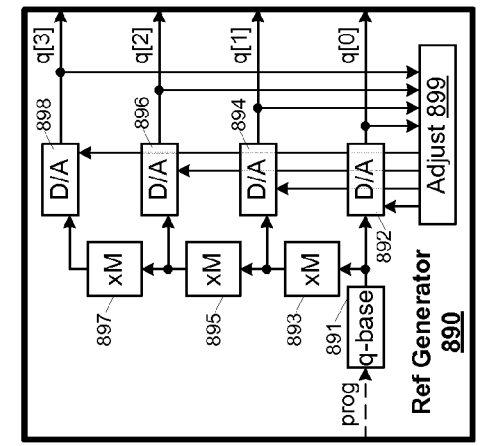
FIG. 18C illustrates an exemplary threshold profile that may be effected by applying reference voltages generated by the reference voltage generator of FIG. 18A (or a variation thereof) as pixel reset voltages.
Figure 18D:
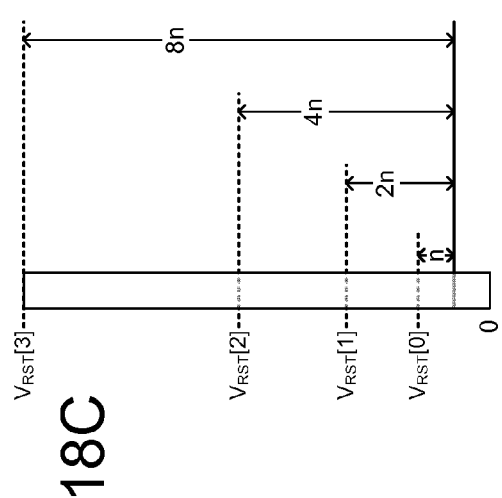
FIG. 18D illustrates an exemplary threshold profile effected by applying multiple pixel reset voltages in combination with multiple threshold voltages.

In one implementation, the digital-to-analog converters of FIG. 18A generate threshold voltages as respective offsets from a pixel reset (or precharge) voltage, thus yielding the threshold profile shown in FIG. 18B. In another embodiment, the reference voltages output from generator 890 are applied as pixel reset voltages instead of decision thresholds, thus enabling binary pixel sub-groups to be reset to respective voltages having different offsets from a threshold level. FIG. 18C illustrates an example of such an arrangement, with the outputs q[3:0] of the reference generator in FIG. 18A constituting binary pixel reset voltages $V_{RST}[3:0]$. As shown, the different reset voltages effect different binary pixel sampling thresholds without requiring multiple reference voltages to be delivered to the sense amplifier (i.e., the output of all binary pixels may be compared with a single reference voltage to yield a logic '1' or logic '0' binary pixel value). Though exponentially related threshold voltages and reset voltages are shown in FIGS. 18B and 18C, numerous other voltage step sizes (including adaptively or algorithmically determined step sizes as well as programmably controlled step sizes) may be applied in alternative embodiments. Also, the two approaches shown in FIGS. 18B and 18C (multi-thresholding through application of non-uniform threshold voltages and multi-thresholding through application of non-uniform pixel reset voltages) may be combined as shown in FIG. 18D. In the example shown, two different pixel reset voltages (VRST[1:0]) are applied in combination with two different reference voltages (q[1:0]) to achieve four distinct binary pixel thresholds. Though a linear threshold step (n, 2n, 3n, 4n) is shown in FIG. 18D, other threshold steps may be effected in alternative embodiments.

Figure 19:
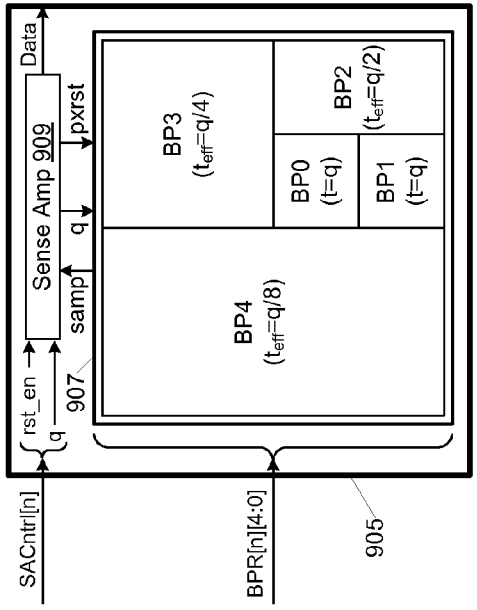
FIG. 19 illustrates an embodiment of a conditional-reset sense-amp super pixel having variably-sized binary pixels to effect a spatial-distribution of non-uniform thresholds without requiring multiple reference voltages.

FIG. 19 illustrates an embodiment of a conditional-reset SSP 905 having variably-sized (i.e., non-uniform) binary pixels 907 to effect a spatial-distribution of non-uniform thresholds without requiring multiple reference voltages. In the example shown, the SSP includes five binary pixels, including two "1×" binary pixels, BP0 and BP1, having sizes corresponding to singe binary pixel cells, a "2×" binary pixel (BP2) sized to occupy approximately twice the area of a 1× binary pixel, a 4× binary pixel (BP3) sized to occupy approximately four times the area of a 1× binary pixel and an 8× binary pixel (BP4) sized to occupy approximately eight times the area of a 1× binary pixel. In one embodiment, the 1× binary pixels and the 4× binary pixels have a square aspect, while the 2× and 8 binary pixels have an oblong aspect, thus enabling all the binary pixels to be disposed compactly within a square SSP footprint. Different size ratios and binary pixel aspect ratios may be used in alternative embodiments (e.g., each binary pixel may have an aspect ratio of $1/2^{1/2}$ so that when doubled along the shorter dimension to produce a larger binary pixel, the same aspect ratio is maintained), particularly where the SSP footprint is oblong or non-quadrilateral.

Regardless of the exact pixel size ratios and aspect ratios, all else being equal, larger binary pixels can have effectively lower thresholds (greater sensitivity) than smaller binary pixels when their outputs are compared with a consistent reference voltage. This is particularly true with extremely small pixel sizes (i.e., at sizes where the capacitance of the photodiode itself does not dominate the overall capacitance of the sensing node) as the larger of two such pixels receives on average proportionally more photoelectrons, and therefore exhibits a faster decline in detection node voltage (on average), than the smaller of two such pixels for the same incoming photon flux. Accordingly, the effective threshold, "$t_{\text{eff}}$," for the 2×, 4× and 8× binary pixels can approach ½, ¼ and ⅛ that of the 1× binary pixel for the same reference voltage, 'q' and thus are shown as 'q/2', 'q/4' and 'q/8', respectively. In devices where the photodiode capacitance is non-negligible, a less pronounced difference will be observed—the differences can be characterized for a specific implementation and expressed as a set of thresholds.

Still referring to FIG. 19, the SSP receives binary pixel row signals and sense amp control signals generally as described in reference to FIG. 13 (including a single reference voltage ('q') and a reset-enable signal ("rst_en") to time the variable temporal oversampling operation described above), except that the number of binary pixel row signals is reduced to account for the reduced number of binary pixels per unit area (i.e., a logarithmically reduced number of binary pixels in the embodiment shown). The reference voltage, q, is applied to all of the binary pixels, thus obviating the distribution and selection of multiple reference voltages. In one embodiment, the same binary pixel layout is applied in all SSPs. In alternative embodiments, the sizes and/or relative positioning of differently-sized binary pixels may be altered from ASP to ASP (e.g., mirrored across an axis). Also, though a single-reference voltage embodiment is shown, multiple reference voltages may be used in combination with non-uniform binary pixel sizes to effect multi-thresholding in other embodiments. For example, two reference voltages can be applied in combination with two sizes of binary pixels to achieve four effective thresholds within a given SSP.

Figure 20:
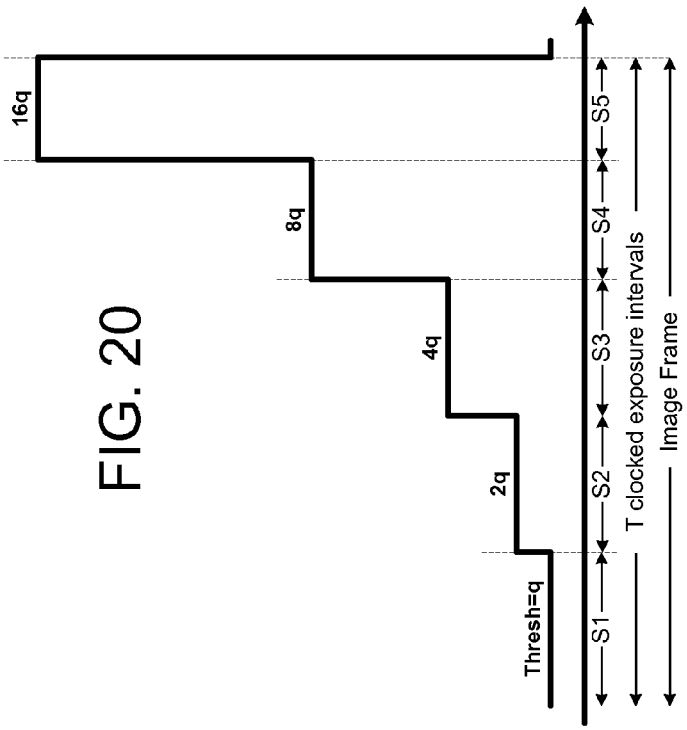
FIG. 20 illustrates an exemplary sequential application of different reference voltages to the binary pixels of an image sensor to effect a temporal rather than a spatial distribution of thresholds.

FIG. 20 illustrates an exemplary sequential application of different reference voltages to the binary pixels of an image sensor to effect a temporal rather than a spatial distribution of thresholds. In the example shown, the T clocked exposure intervals (each corresponding to a read-out of the image sensor) that constitute an image frame period are divided into a number of sub-frame intervals (five in the example shown), each associated with a respective sampling threshold. Thus, a single threshold 'q' is applied in sense/read-out operations executed within all binary pixels within the image sensor for the exposure intervals that constitute a first sub-frame interval, S1. At the conclusion of S1, the threshold is adjusted (e.g., doubled in this example) and again applied in sensor-wide binary pixel sense/read-out operations for the exposure intervals that constitute a second sub-frame interval, S2. This threshold-adjust and sensor read-out approach is repeated for each of the remaining sub-frame intervals, until the conclusion of the image frame interval is reached (i.e., image sample count=T). In alternative embodiments the threshold voltage may be stepped between more, fewer and/or different threshold levels than those shown, and the threshold steps may progress downward instead of upward or even be non-monotonic. Also, the number of image samples acquired for respective thresholds may be non-uniform (i.e., capturing more image samples at one threshold than another). Further, all such parameters (threshold value applied in each sub-frame interval, number of image samples per sub-frame interval, number of threshold steps per image frame) may be varied dynamically according to ambient conditions or other considerations (e.g., power mode, image resolution, ISO, etc.). The temporally adjusted thresholds may be employed in combination with either or both of the spatially-distributed threshold approaches described above (i.e., different reference voltages applied in connection with respective sub-groups of binary pixels and/or variably-sized binary pixels). Moreover, in all such cases, variable temporal oversampling may be employed so that a given binary pixel is reset only if its binary pixel value exceeds the threshold applied in the sampling interval.

Figure 21:
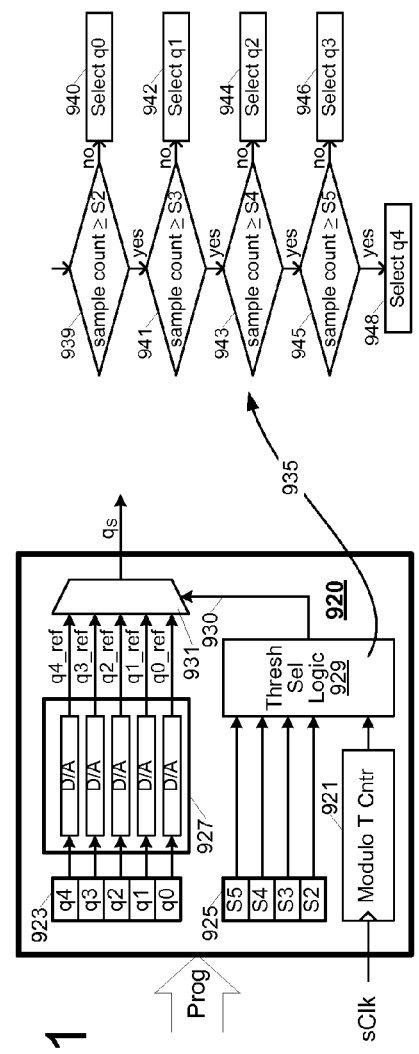
FIG. 21 illustrates an embodiment of a threshold generator that may be used to generate sequentially adjusted sampling thresholds as described in reference to FIG. 20.

FIG. 21 illustrates an embodiment of a threshold generator 920 that may be used to generate sequentially adjusted sampling thresholds as described in reference to FIG. 20. In one embodiment, threshold generator 920 is included within the row control logic of an image sensor IC (e.g., logic 155 of FIG. 3) and outputs a sequence of reference voltages as part of the sense-amp control signals supplied to the SSPs of the image sensor. In alternative embodiments, the threshold generator may be disposed elsewhere within an image sensor IC, or even partly or completely off-chip (e.g., in a host processor that outputs a sequence of digital reference values to be converted to analog form within the image sensor IC and applied in binary pixel sense/read-out operations).

In the embodiment shown, reference generator 920 includes a modulo T counter 921, threshold select logic 929, sub-frame-interval register 925, threshold register 923, D/A converter bank 927 and selector circuit 931. Subframe-interval register 925 includes storage fields to store sub-frame count values above which a corresponding one of the thresholds programmed within threshold register 923 is to be applied. In the implementation shown, for example, sub-frame-interval register 925 includes four storage fields that define the durations (in clocked exposure intervals) of the final four sub-frame intervals within the image frame period, with the first sub-frame interval (i.e., S1) being implied by the S2 sub-frame count value. More or fewer sub-frame intervals than the five shown may be supported in alternative embodiments.

Still referring to FIG. 21, modulo-T counter 921 counts transitions of a clock signal, Clk, counting up from zero to T−1 before overflowing to zero (or down from T−1 to zero before underflowing to T−1). The counter output, which represents a count of the sensor read-out being performed (i.e., the '$i^{th}$' one of the T image samples to be acquired within the image frame period) and thus a sample count, is supplied together with the sub-frame count values from register 925 to threshold select logic 929. Threshold select logic 929 compares the sample count to the sub-frame count values to produce a threshold-select value 930 corresponding to the sub-frame count range in which the sample count falls. That is, as shown in conceptual view 935, if the sample count is less than the S2 sub-frame count value (negative determination at 939), threshold select logic 929 outputs a threshold-select value to selector circuit 931 to select the q0 reference voltage (i.e., voltage level generated by D/A converter bank 927 in response to the q0 value programmed within threshold register 923) to be output as the sub-frame threshold, '$q_s$' (940). After the sample count reaches the S2 sub-frame count (affirmative determination at 939) the threshold select logic outputs a threshold-select value to select the q1 reference voltage at 942 and continues to do so until the sample count reaches the S3 sub-frame count (affirmative determination at 941). Upon reaching the S3 sub-frame count, the threshold select logic outputs a threshold-select value to select the q2 reference voltage at 944 and continues to do so until the sample count reaches the S4 sub-frame count (affirmative determination at 943). Similarly, upon reaching the S4 sub-frame count, the threshold select logic outputs a threshold-select value to select the q3 reference voltage at 946 and continues to do so until the sample count reaches the S5 sub-frame count (affirmative determination at 945), after which the threshold select logic outputs a threshold-select value to select the q4 reference voltage at 948.

The threshold generator of FIG. 21 may be varied in numerous ways in alternative embodiments. For example the D/A converters may be omitted and the threshold values instead output as set of digital signals (e.g., an N-bit signal that can be used within recipient sense amplifiers to adjust a digitally-controlled reference). Also, a single "base" threshold value may be programmed within a threshold control register and applied within other circuitry to derive the remaining thresholds (or all of the thresholds) as in the embodiment of FIG. 18A. Similarly, a single sub-frame count value (or smaller number of sub-frame count values) may be programmed and used to derive the remaining sub-frame count values. More generally, any circuitry capable of outputting different thresholds for different subframe intervals within an image frame interval may be used in alternative embodiments.

Threshold Calibration

Numerous techniques may be applied to calibrate thresholds in a multi-threshold binary pixel image sensor including, for example and without limitation, image-data-dependent calibration techniques as well as precision reference comparison. In all cases, calibration operations may be executed by logic on the image sensor die and/or on an IC coupled to the image sensor IC. Calibration operations may be carried out at regular intervals, opportunistically (e.g., when an idle state is detected or another maintenance operation is being performed) or in response to events such as threshold divergence detection, user input, etc. Also, in some embodiments, the calibration techniques may be used not only to adjust the sensor thresholds, but also (or alternatively) to detect the ratios of the observed thresholds and adjust the image reconstruction algorithms to reconstruct relative luminance based on the observed thresholds from the instant the image was gathered.

Reconstruction of a multilevel-per-pixel image from a variable-temporal oversampled—and potentially multi-thresholded—binary pixel array is somewhat different than for a prior art reset binary pixel array. For a single threshold array, each ASP can return a value ACC(i,j) for the number of binary '1' pixel outputs observed spatially and temporally within that ASP for an image frame. ACC(i,j) can be accumulated on-chip, partially on-chip and partially off-chip, or completely off-chip, e.g., using the methods described above for reset binary pixel array. Once the accumulation is made, however, the device completing the accumulation can either convert the accumulation to a relative luminance value or pass the raw accumulation downstream to a storage or processing device for downstream conversion.

The relative luminance value estimated for a non-reset binary pixel ASP is, in one embodiment, the maximum likelihood relative luminance mapping to ACC(i,j). Due primarily to photon shot noise and quantization noise bias (there is a non-zero likelihood that a binary pixel will exceed the current threshold by more than one photoelectron between sample times), a range of luminance can produce each possible value of ACC(i,j). The maximum likelihood relative luminance is the luminance value that is most probable given ACC(i,j). The values can be derived from an equation and stored in a lookup table or evaluated directly by a processor, derived via simulation and stored in a lookup table, or derived via controlled measurements and stored in a lookup table. A lookup table can be stored in on- or off-chip nonvolatile memory, transferred from such memory to an on- or off-chip volatile memory for use, or created directly by a host processor for a given current thresholds/samples setting set.

A variety of approaches exist when the non-reset binary pixel ASP is operated in a multi-threshold mode. In one approach, a value ACC(i,j) is returned for each ASP as in the single-threshold case, and evaluated by an equation or input to a lookup table as in the case above. The equation/lookup table result depends on the actual thresholds used and the number of sample points available per ASP at each sample point. When the equation or lookup table miss-models these factors, reconstruction errors will result. The calibration methods described above can reduce such errors in an appropriate embodiment.

Although a direct estimate from a multi-threshold joint-accumulated ASP is possible, such an estimate is generally sub-optimal. Optimality is not achieved because not all accumulated samples have the same probability density function—intuitively, a threshold that is exceeded at almost every observation point has a much larger uncertainty than one that is exceeded at roughly every third observation point. Thus a better estimate can be obtained if it is possible for the binary sensor to return, for each ASP, separate accumulations $ACC(q_n)(i,j)$ for each threshold $q_n$. A relative luminance maximum likelihood function can then be evaluated from the joint probability density function of all ACC $(q_n)(i,j)$, considered together. In one embodiment, the joint PDF is stored as a multidimensional lookup table, from which relative luminance is interpolated. In another embodiment, the PDFs are assumed independent and are represented separately for each threshold $q_n$. The individual PDFs are then jointly evaluated to produce an estimate.

Non-Uniform Sampling Intervals

FIGS. 22A and 22B illustrate operation of a conditional-reset binary pixel sensor in low-light and high-light conditions. In the low-light case (FIG. 22A), the total number of photon strikes over the duration of the frame interval ($t_{FRAME}$) is insufficient to exceed the binary detection threshold (q) so that a pixel value of zero (no detection) results. In a number of embodiments, the pixel control logic may detect this zero-detect condition and responsively adjust the detection threshold (e.g., iteratively reducing the number of photon strikes required to yield a '1'), thus adaptively increasing low-light sensitivity.

In FIG. 22B, the high luminance fills the photodiode well (i.e., binary pixel saturates) during every sampling interval, thus yielding a logic '1' sample (and triggering a reset) for each of the N samples. That is, the high light intensity has exceeded the dynamic range of the pixel (i.e., with the response curve flat-lining at the maximum sample value) such that further increase in intensity (or even decrease down to the point at which at least one logic '0' is detected) is undetected.

Figure 23:
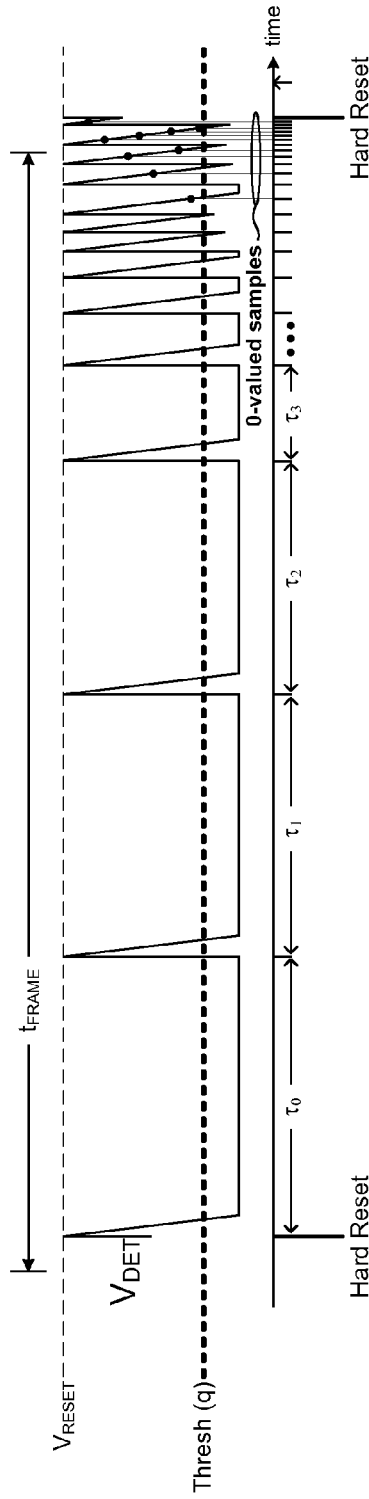
FIG. 23 illustrates an approach for extending the dynamic range of a conditional-reset binary pixel.

FIG. 23 illustrates an approach for extending the dynamic range of a conditional-reset binary pixel. As shown, instead of sampling the binary pixel at uniform intervals throughout the frame period, the frame period is divided into a number of non-uniform sampling intervals in which the longest sampling interval ($\tau_{max}$) is longer than a sampling interval in the uniform case ($\tau_{fix}$) and the shortest sampling interval ($\tau_{min}$) is shorter than the uniform sampling interval. In one embodiment, for example, a logarithmic progression of sampling intervals from longest to shortest (or vice-versa, though non-monotonic progressions may also be used) is applied, with the sum of $n_t$ sampling intervals totaling to the frame period (i.e., $t_{exp}$ or $t_{FRAME}$) and the sampling interval durations defined as follows:

$$\frac{\tau_i}{\tau_{min}} = \text{round}\left[2^{\frac{i-1}{n_t-1}\log_2\left(\frac{\tau_{max}}{\tau_{min}}\right)}\right],$$

where $t_i$ is the duration of the $i^{th}$ sampling interval (i ranging from 0 to $n_t-1$). Other interval-duration progressions may be used in alternative embodiments, including linear progressions, heuristically determined progressions, user-specified patterns, etc.

As shown in FIG. 23, the shortened sampling intervals permit detection of non-activated binary pixels (i.e., sampling a logic '0') even in the high-light condition that saturated the uniform-progression binary pixel sensor. That is, by shortening the time between a subset of the samples within the frame period, it becomes possible to distinguish between intensity variations even at extremely high-light conditions, thus extending the dynamic range of the sensor. More generally varying the duration of the temporal sampling periods may enable the same dynamic range to be achieved as in the uniform sampling-period case in fewer total samples (i.e., same dynamic range at reduced bit depth) and thus with reduced power consumption. Alternatively (or additionally), varying the duration of the temporal sampling periods may enable improved dynamic range and signal-to-noise ratio with only one or a few binary thresholds, thus simplifying sensor implementation.

FIG. 27A illustrates a sensor response corresponding to the logarithmic progression of the temporal sampling interval (i.e., logarithmically shortening the sampling interval, $\tau$, such that $\tau$ shrinks from an initial value of $2000*\tau_{min}$, to $1*\tau_{min}$, where $\tau_{min}$ is the duration of the shortest sampling interval), showing that the dynamic range is extended well beyond the saturation point of a uniform sampling sensor (i.e., a sensor that acquires $n_t$ samples throughout an exposure interval, $t_{exp}$, such that each sampling interval has a uniform or fixed duration $\tau=1*t_{exp}/n_t$). FIG. 27B illustrates the relative duration of individual values of the sampling interval ($\tau$) as a percentage of the frame interval, and the number of occurrences of each.

Figure 24B:
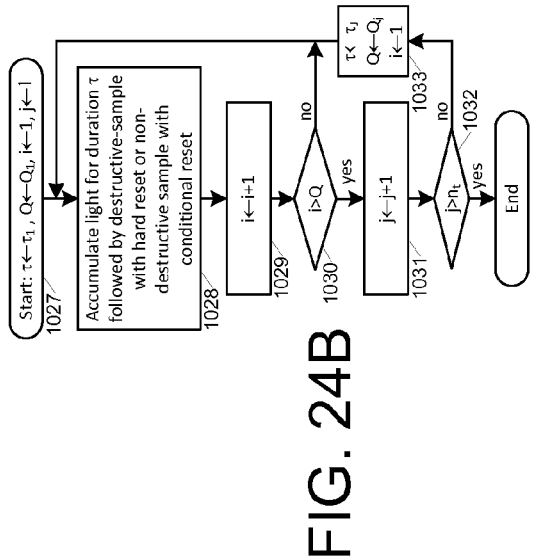
FIG. 24B illustrates an exemplary flow of the finite state machine of FIG. 24A.
Figure 24A:
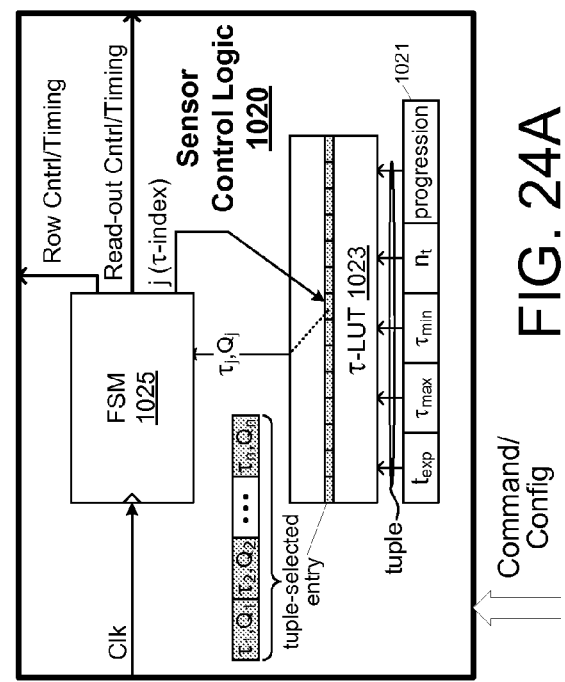
FIG. 24A illustrates a sensor control logic embodiment that may be used to implement the control logic of FIG. 3 in a binary pixel image sensor having non-uniform sampling intervals.

FIG. 24A illustrates a sensor control logic embodiment that may be used to implement control logic 153 of FIG. 3 in a binary pixel image sensor having non-uniform sampling intervals. As shown, a configuration register 1021 may be programmed with parameters including, for example and without limitation, frame period ($t_{exp}$), maximum sampling interval duration ($\tau_{max}$), minimum sampling interval duration ($\tau_{min}$), number of samples ($n_t$), progression policy (e.g., linear, logarithmic, heuristic, prescribed pattern, etc.) and so forth. The contents of the programmable register form a tuple (i.e., a composite value) that is applied to lookup table 1023 to select an entry containing a set of sampling intervals and their respective numbers of occurrences within each frame period. A finite state machine 1025 steps through (i.e., selects in turn) each sampling interval ($\tau$)/occurrence-count (Q) pair within the selected table entry to generate row control/timing signals and read-out control/timing signals that correspond to the various sampling intervals and their corresponding numbers of occurrences.

FIG. 24B illustrates an exemplary flow of the finite state machine 1025 (FSM) of FIG. 24A. Starting at 1027, the variable sampling interval ($\tau$) and occurrence count (Q) are initialized to a first interval/occurrence pair ($\tau_1$, $Q_1$) obtained from the interval lookup table (i.e., element 1023 of FIG. 24A), and an occurrence index, i and interval index j are set to initial values (i.e., i=1, j=1). At 1028, the FSM allows light to be accumulated within the binary pixel array for duration $\tau$, followed by either a destructive-sampling operation with a hard reset, or a non-destructive sampling operation with a conditional reset. The occurrence index is incremented at 1029 and then compared with the occurrence count (Q) at 1030. If the occurrence index does not exceed the occurrence count (i.e., negative determination at 1030), the light accumulation operation at 1028 is repeated to acquire another sample following light accumulation at the same sampling interval. After the final occurrence of a given sampling interval (i.e., affirmative determination at 1030), the interval index 'j' is incremented at 1031 and compared with the maximum index (i.e., $n_t$, the total number of sampling intervals per exposure interval) at 1032. If the interval index does not exceed the maximum index, then the occurrence index is reset and a new sampling interval and occurrence count ($t_j$, $Q_j$) are assigned as the sampling interval and occurrence count for the next iteration of the operations at 1028-1030. If the interval index exceeds the maximum index, then the exposure interval is deemed to be complete.

Figure 25:
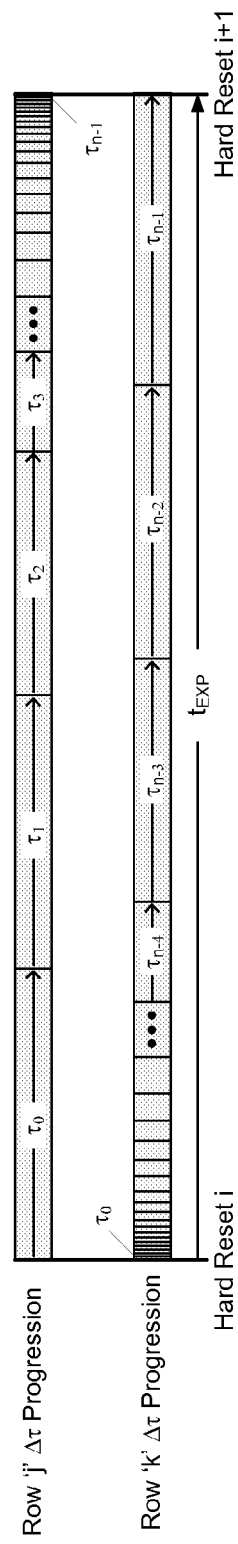
FIG. 25 illustrates exemplary non-uniform sampling interval progressions that may be employed to balance the pixel sampling workload through an exposure interval.

Depending on light level, a quality setting, or some other parameter, it may be desirable to adjust the shortest sampling intervals to a duration that makes it impossible to sample all rows in the array at that duration during a single pass. In such a case, different parts of the array can be sequenced differently to accommodate the shortest sampling. For instance, some of the rows of the array can be in a long-duration sample interval while others are in shorter-duration sampling intervals, with the overall scheduling adjusted to not exceed the sample rate limitations of the pixel readout (or device readout) circuitry. One example of such non-uniform sampling interval progressions is presented in FIG. 25. As shown, the sampling interval progressively shortens for row 'j' (e.g., following a logarithmic, linear, or other progression), and progressively lengthens for row 'k,' thereby balancing the pixel sampling workload during the exposure interval shown ($t_{exp}$). While symmetric progressions are shown (i.e., the $\Delta\tau$ progression in row 'k' is the mirror image of the $\Delta\tau$ progression in row 'j'), numerous other progression interval variations may be employed in alternative embodiments.

Figure 26:
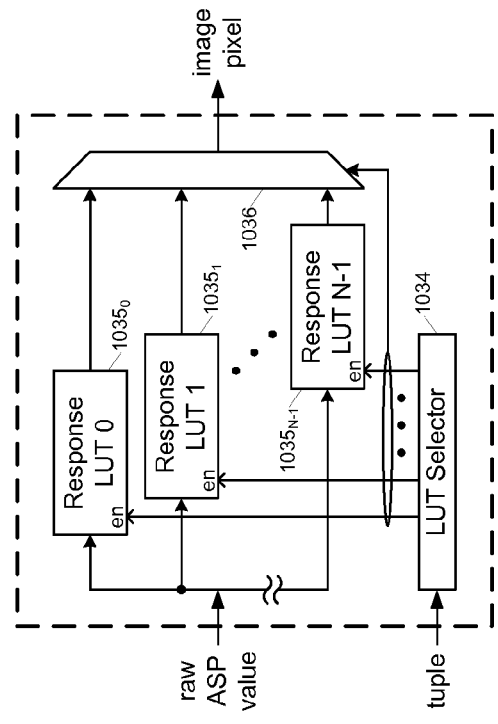
FIG. 26 illustrates an exemplary image reconstruction circuit (e.g., implemented on chip with the binary pixel image sensor or in a separate IC die) that may be used to generate image pixels in response to raw ASP values obtained from binary pixels sampled with non-uniform sampling intervals.

FIG. 26 illustrates an exemplary image reconstruction circuit (e.g., implemented on chip with the binary pixel image sensor or in a separate IC die) that may be used to generate image pixels in response to raw ASP values obtained from binary pixels sampled with non-uniform sampling intervals. In the particular embodiment shown, a set of lookup tables $1035_0$-$1035_{N-1}$ each corresponding to a response curve (e.g., as shown in FIG. 31) for a given pattern of non-uniform sampling intervals, thresholds and other parameters expressed by an incoming selector value, "tuple." As shown, the selector value is supplied to a LUT selector 1034 which asserts one of N enable signals (i.e., according to the value of the LUT selector) to enable one of the LUTs $1035_0$-$1035_{N-1}$ to respond to the incoming "raw" ASP value by outputting an image pixel value corresponding to the point on the LUT-curve indexed by the ASP value. The enable signals are also supplied to a multiplexer 1036 (or other selector circuit) to pass the image pixel output from the enabled LUT to downstream logic or I/O circuitry.

Reflecting on the various embodiments of integrated-circuit image sensors disclosed herein, it should be noted that the integrated-circuit image sensors may, in all cases, be implemented on a single die or by multiple dies (e.g., in a die-stack and/or side-by-side arrangement as in a system-on-chip, system-in-package, multi-die package, multi-chip module, package-on-package, package-in-package, and so forth). For example, some or all of the various logic functions (e.g., look-up tables, counter circuits, buffer circuits, etc.) may be implemented on a different die than the die bearing light-sensitive pixels, with the different dies being wire-bonded, cabled, interconnected by TSVs or otherwise coupled to one another to form the final integrated-circuit image sensor.

Sensor Modeling and Design

As discussed above, binary pixel image sensors can be built using many different ways of sampling sensor response and combining sampled responses into representations of incoming light intensity. The theory described in this section restricts the combination of sampled response to the simplest approach, i.e. the counting of above threshold events. It allows, however, for full flexibility in pixel design and sampling control. This approach will be useful for implementation in hardware since counters are easy to implement and the desired sensor response curve can be achieved by designing the sampling within a wide range of options.

The approach below allows calculating the expected value of sensor response for spatially and temporally variable thresholds, variable duration of time intervals between samplings and variable photo-sensitive area of a pixel.

Sensor Response Based on Photon Statistics

The response of a binary pixel sensor using counters of above threshold events is the value of the count for an image pixel.

TABLE 1

Pixel Naming Convention

| | | |
|---|---|---|
| BP | Binary pixel | Physical pixel that is sampled and compared to a threshold, each sampling of a binary pixel yields a zero when below threshold and a one when at or above threshold. |
| IP | Image pixel | One pixel of the final image having a value between 0 and the maximum possible count (all contributing binary pixels are sampled as one at every contributing sampling). |
| ASP | Algorithmic super pixel | The set of binary pixels that are combined into one value of the response. Each image pixel has one ASP associated with it, binary pixels can however contribute to more than one image pixel if the ASP are larger than the IP and partially overlapping |

TABLE 2

Variable Names

| | |
|---|---|
| $\Lambda$ | Average number of photons impacting an ASP during the exposure time |
| $t_{exp}$ | Exposure time |
| A | Area of an ASP |
| $\Phi$ | Photon flux per area and time |
| N | Temporal oversampling - number of readouts of ASP during exposure time |
| S | Spatial oversampling - number of BP in ASP |
| $t_m$ | Duration of sampling interval m |
| $\theta_{i,m}$ | Sampling threshold of BP of type i in sampling interval m |
| $a_i$ | Area of BP of type i |
| $\lambda_{i,m}$ | Average number of photons impacting a BP of type i during sampling interval m |
| $n_T$ | Number of types of BP (different types have different spatial thresholds and/or area) |
| $s_i$ | Number of BP of type i |
| $p_{i,m}$ | Probability to sample above threshold at a BP of type i at sampling interval m |
| $r_{i,m}$ | Probability to reset a BP of type i at sampling interval m |
| Y | ASP response (value at end of exposure time) |
| $\mathbb{E}(Y)$ | Expected value of ASP response |

Examples of equations for response calculation include the following:

General $$S = \sum_{i=1}^{n_T} s_i \quad (1)$$

$$t_{exp} = \sum_{m=1}^{N} t_m \quad (2)$$

$$A = \sum_{i=1}^{n_T} s_i a_i \quad (3)$$

$$\Lambda = \Phi t_{exp} A \quad (4)$$

$$\lambda_{i,m} = \Lambda \frac{t_m}{t_{exp}} \frac{a_i}{A} = \Phi t_m a_i \quad (5)$$

$$Q(\lambda, \theta) = 1 - e^{-\lambda} \sum_{k=0}^{\theta-1} \frac{\lambda^k}{k!} \quad (6)$$

Probability to Exceed Threshold $$p_{i,1} = Q(\lambda_{i,1}, \theta_{i,1}) \quad (7)$$

$$p_{i,2} = \quad (8)$$

$$r_{i,1} Q(\lambda_{i,2}, \theta_{i,2}) + \sum_{n=0}^{\theta_{i,2}-1} \frac{\lambda_{i,1}^n e^{-\lambda_{i,1}}}{n!} Q(\lambda_{i,2}, \theta_{i,2} - n) + \sum_{n=\theta_{i,2}}^{\theta_{i,1}-1} \frac{\lambda_{i,1}^n e^{-\lambda_{i,1}}}{n!}$$

For $m \in [3, N]$ and $i \in [1, n_T]$ (9)

$$p_{i,m} = r_{i,m-1} Q(\lambda_{i,m}, \theta_{i,m}) +$$

$$\sum_{n=0}^{\theta_{i,m}-1} P_{1,m-1}^{(i,n)}(\lambda_{i,1} \ldots \lambda_{i,m-1}, \theta_{i,1} \ldots \theta_{i,m-1}) Q(\lambda_{i,m}, \theta_{i,m} - n) +$$

$$\sum_{j=1}^{m-2} r_{i,j} \sum_{n=0}^{\theta_{i,m}-1} P_{j+1,m-1}^{(i,n)}(\lambda_{i,j+1} \ldots \lambda_{i,m-1}, \theta_{i,j+1} \ldots \theta_{i,m-1})$$

$$Q(\lambda_{i,m}, \eta_{i,m} - n) +$$

$$\sum_{n=\theta_{i,m}}^{\theta_{i,m-1}-1} P_{1,m-1}^{(i,n)}(\lambda_{i,1} \ldots \lambda_{i,m-1}, \theta_{i,1} \ldots \theta_{i,m-1}) +$$

$$\sum_{j=1}^{m-2} r_{i,j} \sum_{n=\theta_{i,m}}^{\theta_{i,m-1}-1} P_{j+1,m-1}^{(i,n)}(\lambda_{i,j+1} \ldots \lambda_{i,m-1}, \theta_{i,j+1} \ldots \theta_{i,m-1})$$

The five terms of the equation denote the probabilities associated with different possibilities of reaching the threshold in interval m:

| | |
|---|---|
| $Q(\lambda_{i,m}, \theta_{i,m})$ | Threshold had been reached at sampling m − 1 and is again reached at sampling m. |
| $P_{j+1,m-1}^{(i,n)}(\lambda_{i,j+1} \ldots \lambda_{i,m-1}, \theta_{i,j+1} \ldots \theta_{i,m-1}) Q(\lambda_{i,m}, \theta_{i,m} - n)$ | Threshold has never been reached before sampling m and is reached at interval m by adding n photons in interval m. |
| $P_{j+1,m-1}^{(i,n)}(\lambda_{i,j+1} \ldots \lambda_{i,m-1}, \theta_{i,j+1} \ldots \theta_{i,m-1}) Q(\lambda_{i,m}, \theta_{i,m} - n)$ | Threshold has been reached at sampling j < m − 1 and is again reached at interval m by adding n photons in interval m. |
| $P_{1,m-1}^{(i,n)}(\lambda_{i,1} \ldots \lambda_{i,m-1}, \theta_{i,1} \ldots \theta_{i,m-1})$ | Threshold has never been reached before sampling m and is reached at interval m without adding photons in interval m because the threshold of sampling m is n photons lower than the number of photons at the end of sampling m − 1. |

| | |
|---|---|
| $P_{j+1,\,m-1}^{(i,\,n)}(\lambda_{i,j+1}\ldots\lambda_{i,\,m-1},\theta_{i,j+1}\ldots\theta_{i,\,m-1})$ | Threshold has been reached at sampling j < m − 1 and is again reached at interval m without adding photons in interval m because the threshold of sampling m is n photons lower than the number of photons at the end of sampling m−1. |

Each term needs to be multiplied with the probability of its occurrence and summed over the combinatorial possibilities of photon combinations to reach it.

The term $P_{a,b}^{(i,n)}(\lambda_{i,a}\ldots\lambda_{i,b},\theta_{i,a}\ldots\theta_{i,b})$ is the probability of a photon sequence of total n photons distributed over the sampling intervals a through b in a way that the threshold is not reached in any sampling interval a through b and that the sensor is not reset after sampling. There are different equations to calculate $P_{a,b}^{(i,n)}(\lambda_{i,a}\ldots\lambda_{i,b},\theta_{i,a}\ldots\theta_{i,b})$ depending on the sequence of thresholds and the reset operation. These equations will be explained below.

Sensor Response

The expected value of the ASP response becomes after calculation of all probabilities $p_{i,m}$.

$$\mathbb{E}(Y) = \sum_{i=1}^{n_T} s_i \sum_{m=1}^{N} p_{i,m} \qquad (10)$$

Sensor with Unconditional Reset and Variable Sampling Interval

As discussed above, pixels in a binary pixel sensor may be unconditionally reset after each sampling. In this case the equations describing the response become much simpler as $$r_{i,m} = 1 \qquad (11)$$

$$P_{a,b}^{(i,n)}(\lambda_{i,a}\ldots\lambda_{i,b}) = 0 \qquad (12)$$

Therefore $$\mathbb{E}(Y) = \sum_{i=1}^{n_T} s_i \sum_{m=1}^{N} Q(\lambda_{i,m},\theta_{i,m}) \qquad (13)$$

Figure 30A:
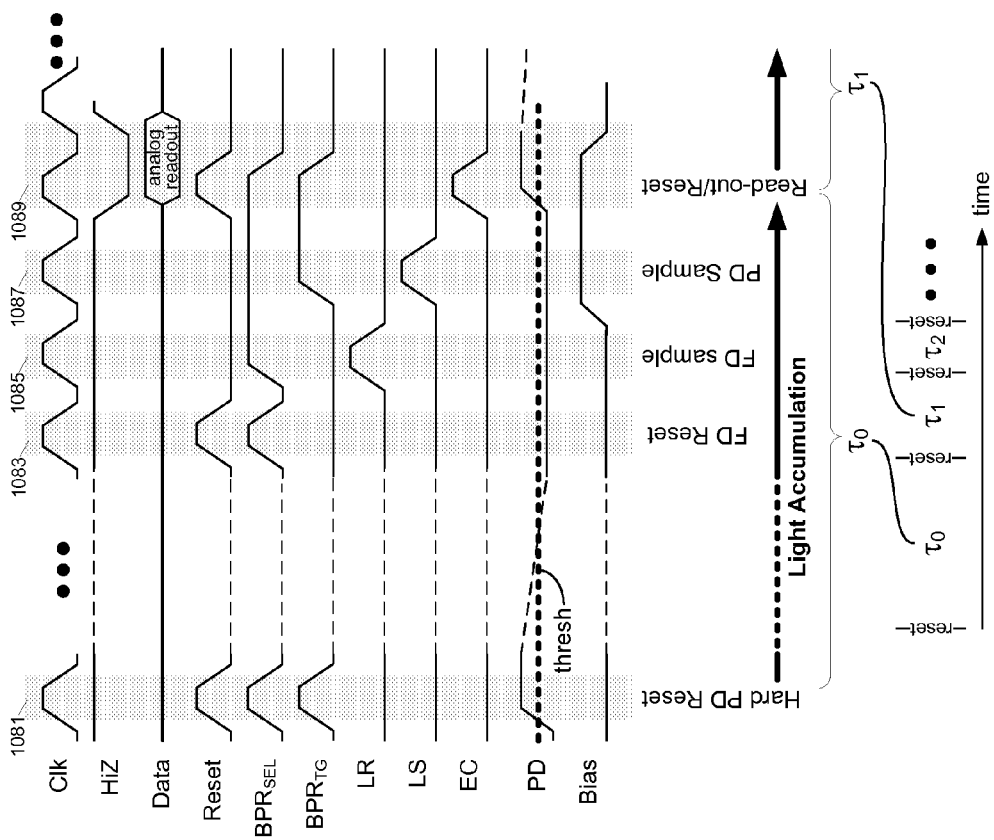
FIG. 30A illustrates an alternative embodiment of a conditional-reset sense amplifier together with a binary pixel that permits correlated double-sampling.
Figure 30B:
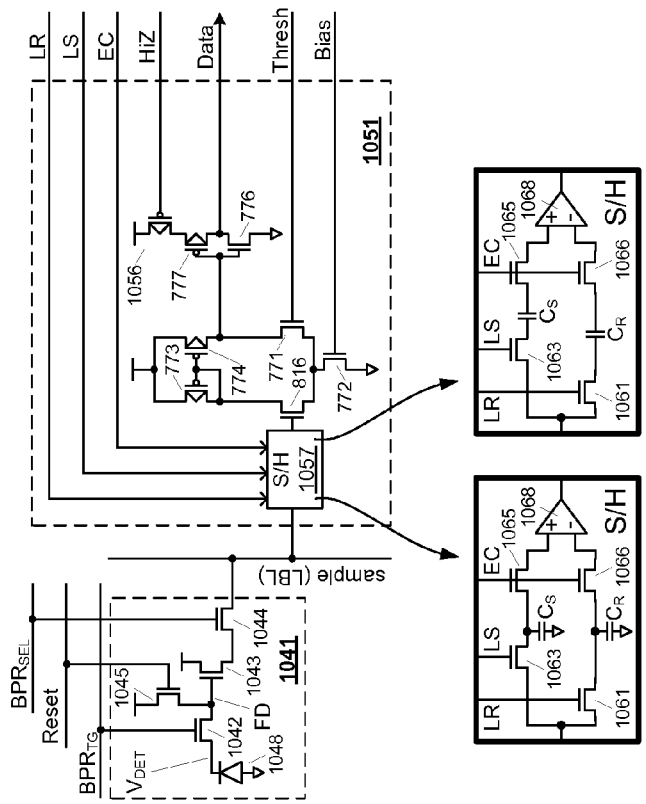
FIG. 30B is a timing diagram illustrating an exemplary operation of a sense-amp super pixel that includes the conditional-reset sense amplifier and binary pixel of FIG. 30A.

FIGS. 30A and 30B show an embodiment of a circuit and exemplary operation of a pixel 1041 and a sense-amplifier 1051 as an example of an embodiment using a 4T-pixel with correlated double sampling (CDS). The pixel 1041 has a floating diffusion (node FD). For a reset the signals Reset and $BPR_{TG}$ are asserted, opening transistors 1042 and 1045 and charging the photodiode 1048. After light accumulation Reset and BPRsel are asserted while $BPR_{TG}$ is not asserted. This opens transistors 1043 and 1044. LR stores the sampled charge of FD on CR. Then BPRsel is asserted together with $BPR_{TG}$. $BPR_{TG}$ moves the charge from the photodiode onto FD. Assertion of LS stores the charge of the photodiode on CS. Lastly EC allows the difference between the reset charge on CR and the photodiode charge on CS to be sensed in the sense-amplifier.

Sensor with Conditional Reset and Thresholds Constant Over Time

If the pixels are conditionally reset only if they are sampled above threshold, then $$r_{i,m} = p_{i,m} \qquad (14)$$

The full equation with all terms needs to be used. As long as the thresholds do not vary in time, it is however possible to find a simplified expression for $P_{a,b}^{(i,n)}(\lambda_{i,a}\ldots\lambda_{i,b})$ as only one threshold needs to be considered in this case.

$$P_{a,b}^{(i,n)}(\lambda_{i,a}\ldots\lambda_{i,b}) = \frac{\left[\sum_{k=a}^{b}\lambda_{i,k}\right]^n e^{-\sum_{k=a}^{b}\lambda_{i,k}}}{n!} \qquad (15)$$

The third term of equation (8) as well as the fourth and fifth terms of equation (9) is zero since there is no change in threshold. The range of the sum over n of the second term of equation (8) and the second and third terms of equation (9) from 0 to threshold minus one makes sure that n is never at or above threshold. The probability of n photons below threshold in the sampling intervals a to b becomes therefore simply the Poissonian probability of n photons. Since the sum of Poissonian probabilities over expected photon numbers is the Poissonian probability of the sum over these expected photon numbers, equation (15) can be used to evaluate equations (9) and (10) to determine the sensor response.

Sensor with Conditional Reset and Thresholds Varying Over Time

The most complex situation is for a sensor with thresholds varying over time where the pixels are conditionally reset only when they have been sampled above threshold. In this case the $P_{a,b}^{(i,n)}(\lambda_{i,a}\ldots\lambda_{i,b},\theta_{i,a}\ldots\theta_{i,b})$ need to be evaluated in detail according to their definition.

$$P_{a,b}^{(i,n)}(\lambda_{i,a}\ldots\lambda_{i,b},\theta_{i,a}\ldots\theta_{i,b}) = \sum_{\{\varphi_a\ldots\varphi_b\}\in\Xi_{a,b}^{(i,n)}} \prod_{l=a}^{b} \frac{\lambda_{i,l}^{\varphi_l} e^{-\lambda_{i,l}}}{\varphi_l!} \qquad (16)$$

The set $\Xi_{a,b}^{(i,n)}$ of photon sequences $\{\varphi_a\ldots\varphi_b\}$ is the subset of all possible photon sequences that fulfill the conditions $$\sum_{l=a}^{b} \varphi_l = n \qquad (17)$$

$$\sum_{l=a}^{k} \varphi_l < \theta_{i,k} \,\forall\, k \in [a, b] \qquad (18)$$

The only simplification still possible can be achieved by examining the sequence of thresholds.

FIG. 28 shows examples of the influence of sequences of thresholds and photon arrivals. In these examples interval m of equation (9) for which the probability is calculated is the third and last interval, intervals a to b of the samplings are the first and second intervals. Each panel A-D has three sequences of photon arrivals a-c. In all cases the total number of photons arriving in the first and second interval is two. In the third and last interval one photon arrives in panels A-C and no photon in panel D. The sequences of panel A and panel B do not contribute to the probability of an above threshold event at the sampling at the end of the third interval. In both cases the threshold would have been reached already at the first or second sampling, thereby not fulfilling the condition of equation (18). A comparison of the photon sequences of panels A and B illustrates that any sequence of thresholds up to the last interval can be reduced to a monotonically increasing sequence as a lower threshold at a later sampling will cause the sequence to violate equation (18). In panel C only sequence b violates equation (18). Sequences a and c contribute to the probability of sampling at or above threshold at the third interval. Panel D illustrates that the threshold at sampling can be reached even when no additional photons arrive in the last interval before sampling m.

More generally equations (16)-(18) can be modified to simplify and combine threshold and sampling interval sequences as much as possible. As a first step all thresholds in sampling a through sampling b are replaced by a monotonic sequence giving the sequence $\theta_{i,a}' \ldots \theta_{i,b}'$ with $\theta_{i,a}' \le \theta_{i,b}'$. The sequence is then reduced to one entry per threshold value to the sequence $\theta_{i,a}^* \ldots \theta_{i,b}^*$ with $\theta_{i,a}^* < \theta_{i,b}^*$. An example can be seen in FIG. 29.

Equation (16) becomes then $$P_{a,b}^{(i,n)}(\lambda_{i,a} \ldots \lambda_{i,b}, \theta_{i,a} \ldots \theta_{i,b}) = \sum_{\{\varphi_a \ldots \varphi_{b^*}\} \in \Xi_{a,b}^{*(i,n)}} \prod_{l=a}^{b^*} \frac{\lambda_{i,l}^{*\varphi_l} e^{-\lambda_{i,l}^*}}{\varphi_l!} \quad (19)$$

The set $\Xi_{a,b}^{*(i,n)}$ of photon sequences $\{\varphi_a \ldots \varphi_{b^*}\}$ is the subset of all possible photon sequences that fulfill the conditions $$\sum_{l=a}^{b^*} \varphi_l = n \quad (20)$$

$$\sum_{l=a}^{k} \varphi_l < \theta_{i,k}^* \, \forall \, k \in [a, b^*] \quad (21)$$

The list of effective thresholds $\theta_{i,k}^*$ fulfills the conditions $$\theta_{i,k}^* < \theta_{i,k+1}^* \, \forall k \in [a, b^*-1] \quad (22)$$

$$\theta_{i,b^*}^* = \theta_{i,b} \quad (23)$$

$$\theta_{i,k}^* \in \{\theta_{i,r}\}_{a \le r \le b} \, \forall \, k \in [a, b^*] \quad (24)$$

$$\theta_{i,r} \ge \theta_{i,r+1} \cdot r \in [a_1, a_2] \quad (25)$$

$$\theta_{i,k}^* = \theta_{i,a_2} \quad (26)$$

The illumination in the modified intervals is determined as $$\lambda_{i,l}^* = \sum_{r=a_1}^{a_2} \lambda_{i,r} \quad (27)$$

Example of Response Curves

Figure 32:
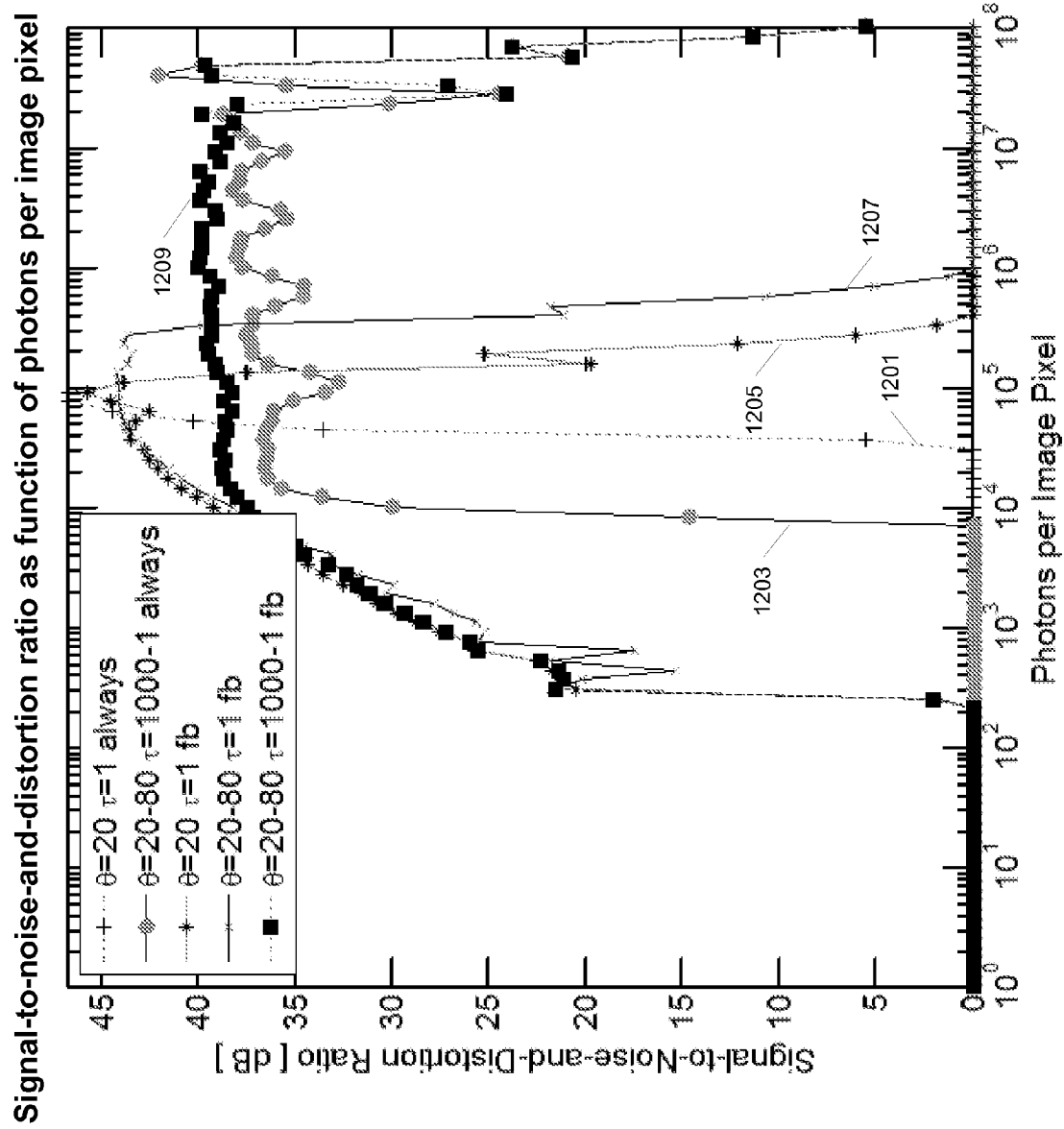
FIG. 32 shows an exemplary signal-to-noise-and-distortion ratio as function of photons per image pixel.
Figure 33A:
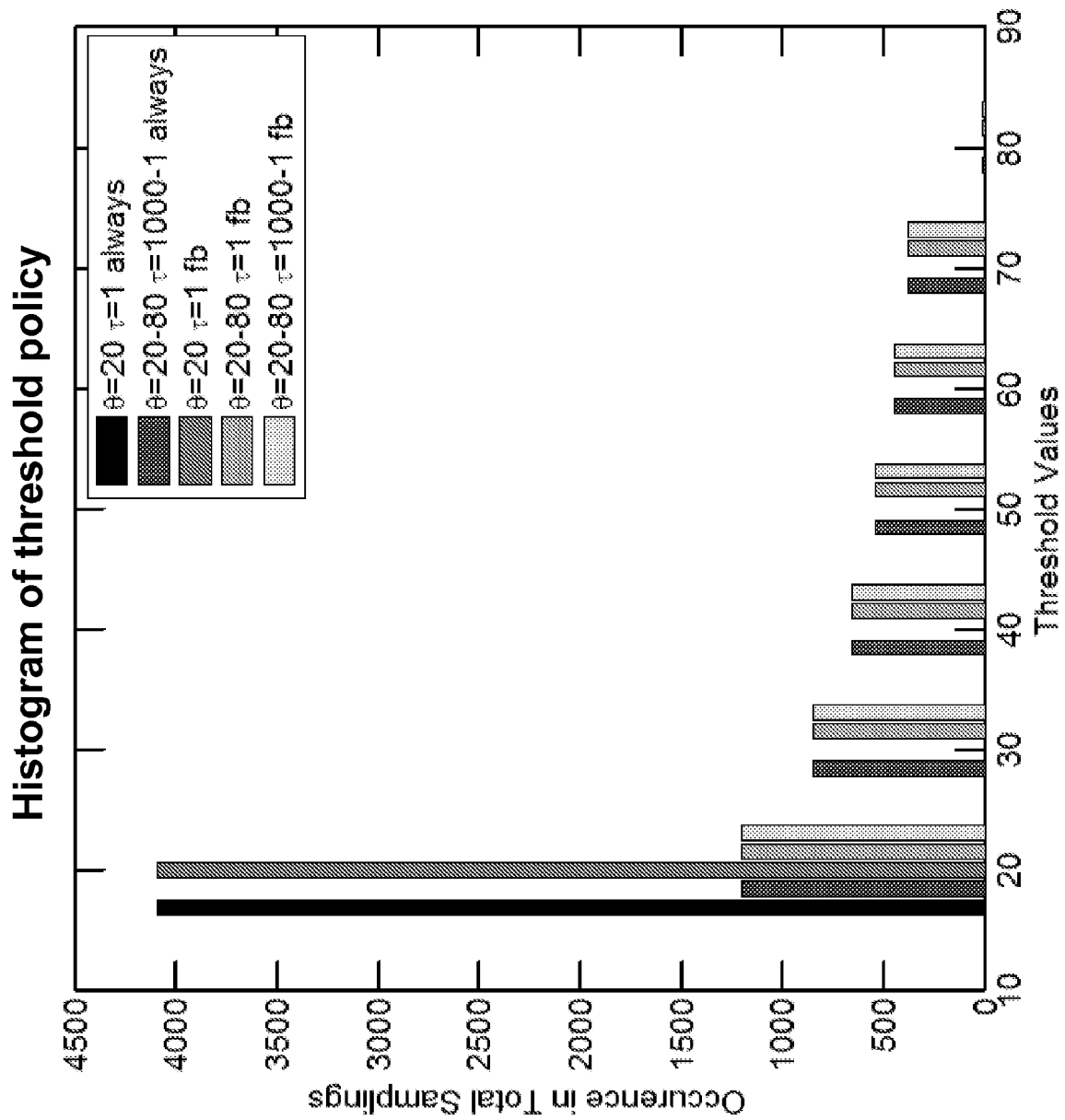
FIGS. 33A and 33B illustrate histograms of threshold and sampling policy.
Figure 33B:
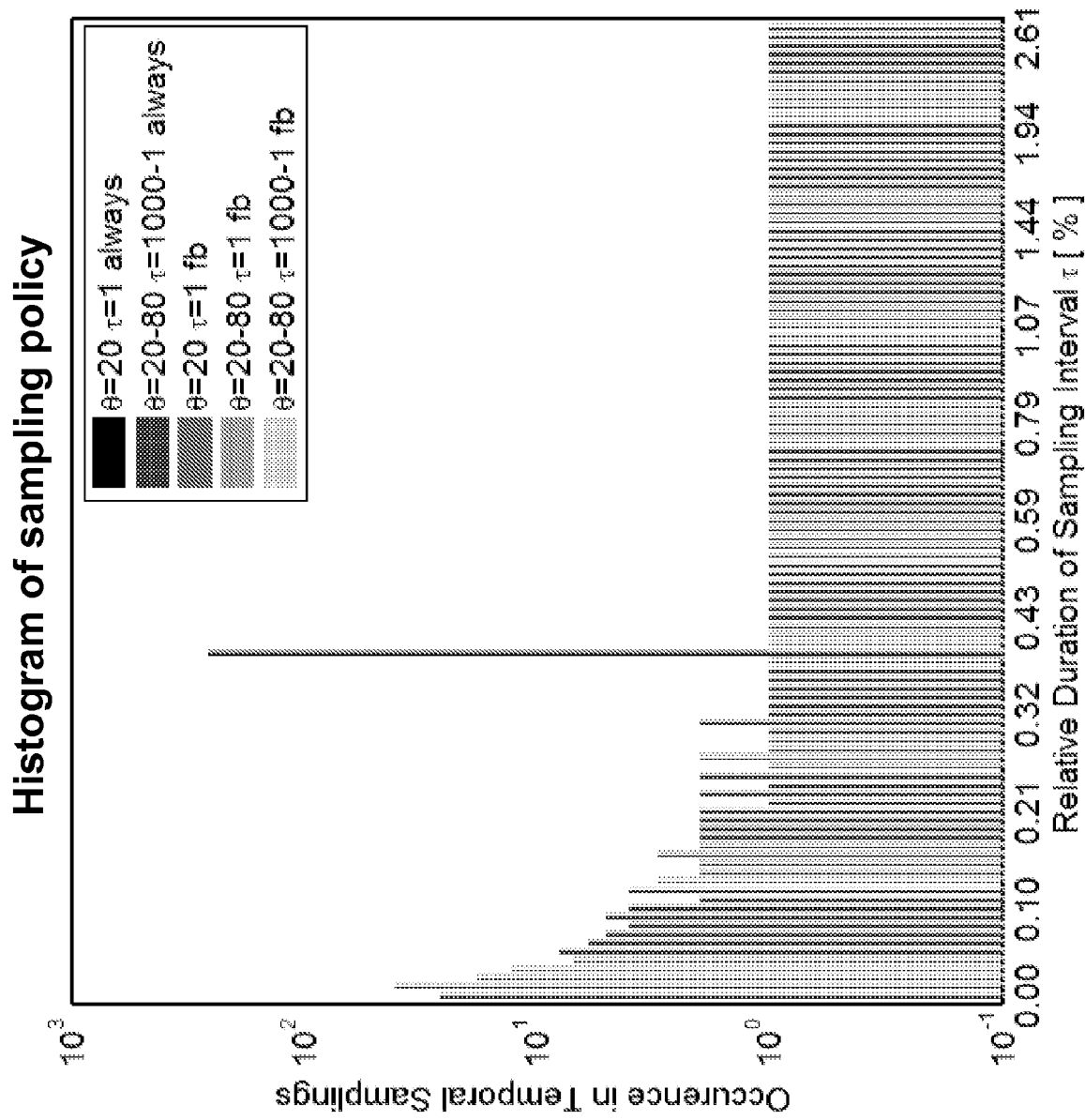

FIG. 31 shows an exemplary sensor response as function of photons per image pixel, and FIG. 32 shows an exemplary signal-to-noise-and-distortion ratio as function of photons per image pixel, comparing different threshold and sampling policies. In all cases the lines are results from calculations using the model of equations (1) to (27) and the markers are results of Monte Carlo simulations of a Poisson distributed photon stream. The dynamic range is given in Table 3 below. The first two curves (1101/1201 and 1103/1203) result from resetting the binary pixels after every sampling. If both the threshold and the length of the sampling interval are kept constant (1101/1201), the dynamic range is very small, as expected. Using both variable threshold and variable duration of sampling intervals (1103/1203) improves both the low light sensitivity (since more photons are collected in the longer intervals) and extends the dynamic range at high light intensity (the shortest sampling interval is of shorter duration). The histograms of threshold and sampling policy are given in FIGS. 33A and 33B. All three curves using conditional reset only when sampled at or above threshold (i.e., curves 1105/1205, 1107/1207 and 1109/1209) have increased response since the sensitivity to low light is then determined by the lowest threshold and the spatial oversampling which has been the same in all examples. Of the three condition examples, using only one threshold and one duration of the sampling interval yields the lowest dynamic range as shown by curves 1105/1205. Curves 1107/1207, which result from varying the threshold but not the duration of the sampling interval, show a slightly larger dynamic range, and the maximum dynamic range is achieved when both threshold and duration are varied (curves 1109/1209).

TABLE 3

| | Dynamic range | | |
|---|---|---|---|
| Threshold policy | Sampling policy | Dynamic range at 0 dB SNDR | Dynamic range at 20 dB SNDR |
| θ = 20, uncond. rst. | τ = 1 | 21 dB | 11 dB |
| θ = 80 − 20, uncond. rst. | τ = 1000 − 1 | 83 dB | 78 dB |
| θ = 20, cond. rst. | τ = 1 | 64 dB | 54 dB |
| θ = 80 − 20, cond. rst. | τ = 1 | 72 dB | 58 dB |
| θ = 80 − 20, cond. rst. | τ = 1000 − 1 | 114 dB | 109 dB |

It should be noted that the various circuits disclosed herein can be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions can be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions can be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

The section headings in the above detailed description have been provided for convenience of reference only and in no way define, limit, construe or describe the scope or extent of the corresponding sections or any of the embodiments presented herein. Also, various modifications and changes can be made to the embodiments presented herein without departing from the broader spirit and scope of the disclosure. For example, features or aspects of any of the embodiments can be applied, at least where practicable, in combination with any other of the embodiments or in place of counterpart features or aspects thereof. Accordingly, the specification and drawings are to be regarded in an illustrative rather than a restrictive sense.

What is claimed is:

1. An image sensor comprising:
a plurality of pixel circuits disposed in rows and columns, each of the plurality of pixel circuits having a first light-detecting element operable to integrate photocharge, output circuitry operable to selectively output a signal indicative of photocharge integrated by the first light-detecting element, and reset circuitry operable to remove photocharge integrated by the first light-detecting element since the prior operation of the reset circuitry;
control circuitry operable to select subgroups of the pixel circuits to output the respective signals indicative of integrated photocharge, and operable such that each pixel circuit in the plurality is selected at least four times during a frame period, wherein the at least four selections of a given pixel circuit are spaced to define a set of sampling intervals within the frame period, including a longest sampling interval at least four times the duration of a shortest sampling interval;
a plurality of comparators, operable such that each pixel circuit in a given subgroup selected by the control circuitry is switchably paired with a respective one of the comparators in response to each of the at least four selections of the pixel circuit to enable generation of a comparison result that indicates whether a threshold is exceeded by the photocharge integrated within the light-detecting element of the pixel circuit during a corresponding one of the sampling intervals;
a plurality of reset signal generators each coupled to receive the output of a respective one of the comparators and operable such that, when the comparison result generated by the respective comparator indicates a threshold exceedance, the reset signal generator asserts a reset signal to cause the reset circuitry within the currently paired pixel circuit to reset the state of the light-detecting element; and
counter logic to generate count values corresponding to respective logical collections of the pixel circuits, each logical collection of the pixel circuits including at least two of the pixel circuits and each of the count values indicating a collective number of threshold exceedances with respect to the constituent pixel circuits of the corresponding logical collection during the frame period.

2. The image sensor of claim 1, wherein the longest sampling interval is at least 100 times the duration of the shortest sampling interval.

3. The image sensor of claim 1, wherein the durations of the sampling intervals are substantially logarithmically distributed.

4. The image sensor of claim 3, wherein the durations of the sampling intervals increase monotonically throughout the frame period.

5. The image sensor of claim 3, wherein the durations of the sampling intervals decrease monotonically throughout the frame period.

6. The image sensor of claim 1, wherein different subgroups of the pixel circuits are selected by the control circuitry according to different progressions of sampling intervals.

7. The image sensor of claim 1, wherein a first one of the sampling intervals for a given pixel circuit is followed by a second sampling interval having a shorter duration than the first sampling interval.

8. The image sensor of claim 7, wherein the duration of the second sampling interval is shorter than the duration of the first sampling interval according to a logarithmic progression.

9. The image sensor of claim 8, wherein the duration of the second sampling interval is shorter than the duration of the first sampling interval according to a binary progression.

10. The image sensor of claim 1, wherein the plurality of comparators comprises a first comparator that is paired at respective times with (i) a first pixel circuit within a first subgroup of the pixel circuits in response to each of at least four selections of the first pixel circuit by the control circuitry and (ii) a second pixel circuit within a second subgroup of the pixel circuits in response to each of the at least four selections of the second pixel circuit by the control circuitry.

11. The image sensor of claim 1 further comprising accumulators paired respectively with pixel circuits to, when one of the reset signal generators generates a binary pixel value indicating threshold exceedance, add a corresponding pixel circuit value to a value stored in the paired accumulator.

12. The image sensor of claim 11, wherein the pixel circuit value is binary.

13. The image sensor of claim 1 further comprising output logic to, when a comparator generates a binary pixel value indicating threshold exceedance, transmit a corresponding pixel circuit value to another circuit.

14. The image sensor of claim 13, wherein the pixel circuit value is binary.

15. The image sensor of claim 1 wherein each logical collection includes pixel circuits disposed in at least two of the subgroups.

16. The image sensor of claim 1, wherein for at least two pixel circuits pairable with one of the comparators, the comparator compares the photocharge integrated by the light-detecting elements of the two pixel circuits with respective, different thresholds.

17. A method of operation for capturing an image frame with a plurality of pixel circuits on an image sensor, the method comprising:

iteratively selecting a subgroup of the pixel circuits to concurrently output respective signals indicative of integrated photocharge, including selecting each of the pixel circuits at least four times during the period of the image frame, wherein the at least four selections of a given pixel circuit are spaced to define a set of sampling intervals, including a longest sampling interval at least four times the duration of a shortest sampling interval;

determining, in response to each selection of a given pixel subgroup and for each pixel circuit in the selected subgroup, whether the respective signal indicative of integrated photocharge exceeds a threshold;

in response to determining that the respective signal indicative of the integrated photocharge exceeds the threshold, resetting the corresponding pixel circuit to a reset state in which the integrated photocharge is removed; and generating count values corresponding to respective logical collections of the pixel circuits, each logical collection of the pixel circuits including at least two of the pixel circuits and each of the count values indicating a collective number of threshold exceedances with respect to the constituent pixel circuits of the corresponding logical collection during the period of the image frame.

18. The method of claim 17, wherein the longest sampling interval is at least 100 times the duration of the shortest sampling interval.

19. The method of claim 17, wherein the durations of the sampling intervals are substantially logarithmically distributed.

20. The method of claim 17, wherein different subgroups of the pixel circuits are selected according to different progressions of sampling intervals.

* * * * *

UNITED STATES PATENT AND TRADEMARK OFFICE
CERTIFICATE OF CORRECTION

PATENT NO. : 9,521,338 B2  
APPLICATION NO. : 14/355814  
DATED : December 13, 2016  
INVENTOR(S) : Thomas Vogelsang et al.

It is certified that error appears in the above-identified patent and that said Letters Patent is hereby corrected as shown below:

On the Title Page

In the listing of inventors on the face of the patent (item (72)), inventor name "Yeuyong Wang" should read --Yueyong Wang--.

Signed and Sealed this  
Fourth Day of April, 2017

Michelle K. Lee  
*Director of the United States Patent and Trademark Office*